US011762052B1

(12) United States Patent
Ganguly et al.

(10) Patent No.: US 11,762,052 B1
(45) Date of Patent: Sep. 19, 2023

(54) SOUND SOURCE LOCALIZATION

(71) Applicant: Amazon Technologies, Inc., Seattle, WA (US)

(72) Inventors: Anshuman Ganguly, Cambridge, MA (US); Mrudula V. Athi, Natick, MA (US); Spencer Russell, Quincy, MA (US); Alexander M. Epstein, Roslindale, MA (US); Wontak Kim, Watertown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 17/475,888

(22) Filed: Sep. 15, 2021

(51) Int. Cl.
*G01S 3/808* (2006.01)
*G10L 15/22* (2006.01)
*G01S 5/20* (2006.01)
*G06T 7/70* (2017.01)

(52) U.S. Cl.
CPC .............. *G01S 3/8083* (2013.01); *G01S 5/20* (2013.01); *G06T 7/70* (2017.01); *G10L 15/22* (2013.01); *G10L 2015/223* (2013.01)

(58) Field of Classification Search
CPC . G01S 3/8083; G01S 5/20; G06T 7/70; G10L 15/22; G10L 2015/223
See application file for complete search history.

(56) References Cited

U.S. PATENT DOCUMENTS

| 10,304,475 B1 * | 5/2019 | Wang ........................ G01S 3/80 |
| 11,433,546 B1 * | 9/2022 | Assaf ....................... B25J 5/007 |
| 2022/0146617 A1 * | 5/2022 | Nakagawa ............ G01S 3/7864 |
| 2022/0300001 A1 * | 9/2022 | Gayaka ..................... G06T 7/74 |

FOREIGN PATENT DOCUMENTS

| CN | 114360546 A | * | 4/2022 | |
| WO | WO-2022068694 A1 | * | 4/2022 | |
| WO | WO-2022198161 A1 | * | 9/2022 | ........... G01C 21/206 |

* cited by examiner

*Primary Examiner* — Daniel Pihulic
(74) *Attorney, Agent, or Firm* — PIERCE ATWOOD LLP

(57) ABSTRACT

Techniques for improving sound source localization (SSL) are provided. A method for probabilistic SSL using a deep neural network (DNN) may include receiving audio data including a representation of audio such as a wakeword from a microphone array. The audio data may be processed by a DNN to output a plurality of values where each value indicates a probability that the audio originated from a direction corresponding to that value. A sensor may provide computer vision or other data which may be used to inform the plurality of values based on detecting presence of a human or obstacle. A probability that the audio originated from one of the directions of the plurality of directions may be determined based at least in part on the DNN output and the computer vision or other data.

20 Claims, 17 Drawing Sheets ance with embodiments of the present disclosure.
SOUND SOURCE LOCALIZATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Electronic devices may be used to capture audio and process audio data. The audio data may be used for voice commands and/or sent to a remote device as part of a communication session. To process voice commands, a device may attempt to isolate desired or target speech associated with a user from undesired speech associated with other users and/or other sources of noise, such as audio generated by loudspeaker(s), machines such as household appliances, or ambient noise in an environment around the device. For example, the device may perform sound source localization (SSL) to distinguish between multiple sound sources represented in the audio data.

Typical SSL approaches may implement an SSL algorithm accompanied by pre-processing and/or post-processing operations. Pre-processing operations may be performed for noise reduction, voice activity detection (VAD), dereverberation, etc. Post-processing operations may be performed for reflection rejection, track smoothing, etc. Such algorithms/operations may increase the computation cost for performing SSL and/or may be difficult to tune and maintain. For example, tuning parameters for pre-processing and/or post-processing operations based on varying acoustic conditions may be difficult and time-consuming.

To improve SSL, devices, systems, and methods are disclosed that implement deep learning techniques and well-labelled datasets to develop deep neural network (DNN) approaches to SSL. Using the techniques and features described by the present disclosure, an SSL approach may include systems and models that learn one or more of the pre-processing and/or post processing operations implicitly through well-labelled datasets and optimize SSL estimation accuracy. For example, a DNN architecture may be used to determine wakeword direction with increased performance while using less processing and memory resources as may typically be expected. As described herein, a probabilistic framework may improve accuracy and reliability of SSL by processing output of a DNN-SSL model in an informed manner using computer vision data (or other sensor data). The probabilistic framework may be scaled to include other auxiliary information from other sensors to improve accuracy and reliability.

Figure 1:
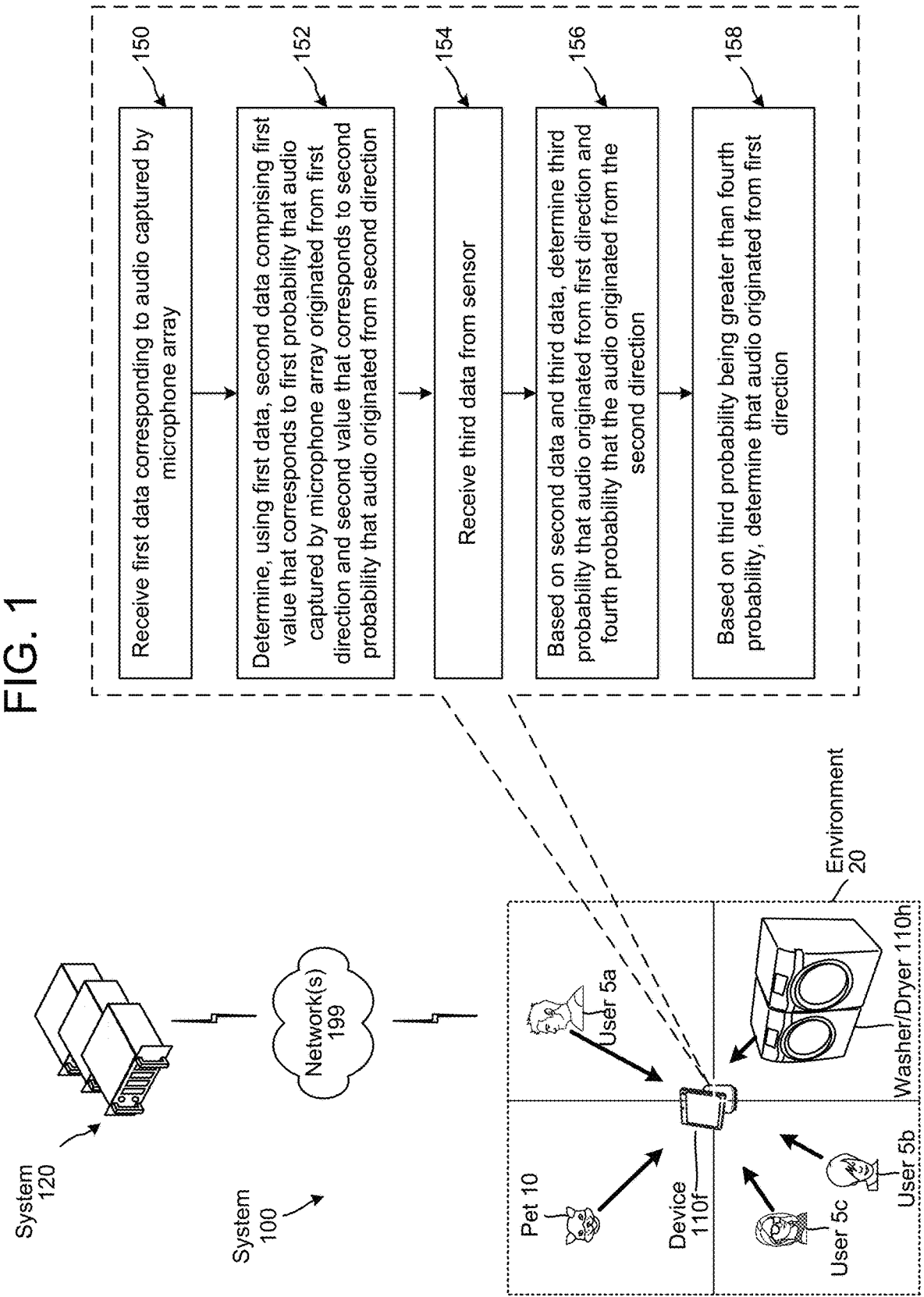
FIG. 1 is a conceptual diagram illustrating a system for probabilistic sound source localization, according to embodiments of the present disclosure.

FIG. 1 illustrates a high-level conceptual block diagram of a system 100 configured to perform probabilistic SSL according to embodiments of the present disclosure. Although FIG. 1, and other figures and discussion may illustrate the operation of the system in a particular order, the steps described may be performed in a different order (as well as certain steps removed or added) without departing from the intent of the disclosure. As illustrated by FIG. 1, the system 100 may include a device 110 (e.g., device 110f) and server(s) 120 that may be communicatively coupled to network(s) 10. The reference designators "device 110" and "device 110f" may be used interchangeably and both terms may refer to the device 110f shown in FIG. 1.

The device 110, may be an electronic device configured to capture and/or receive audio data. The device 110 may include a microphone array configured to generate audio data, although the disclosure is not limited thereto and the device 110 may include multiple microphones or multiple microphone arrays without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

The device 110 may also be a camera-enabled device and include a camera device and/or one or more camera sensors (e.g., sensor 200 of FIG. 2) for capturing image and/or video data for processing. The image and/or video data may be processed locally by the device 110 or remotely by the system(s) 120. The device 110 may include a display screen with a camera sensor(s) mounted to the display screen. The display screen may be mounted on a motor. The camera system of the device 110 may use a computer vision service or application to look for a face and/or detect a human or other objects. In some embodiments, the display screen may be caused to move to face a direction of a human that uttered a wakeword (or other audio such as dog barking or glass breaking) based on SSL performed for the wakeword.

Figure 13:
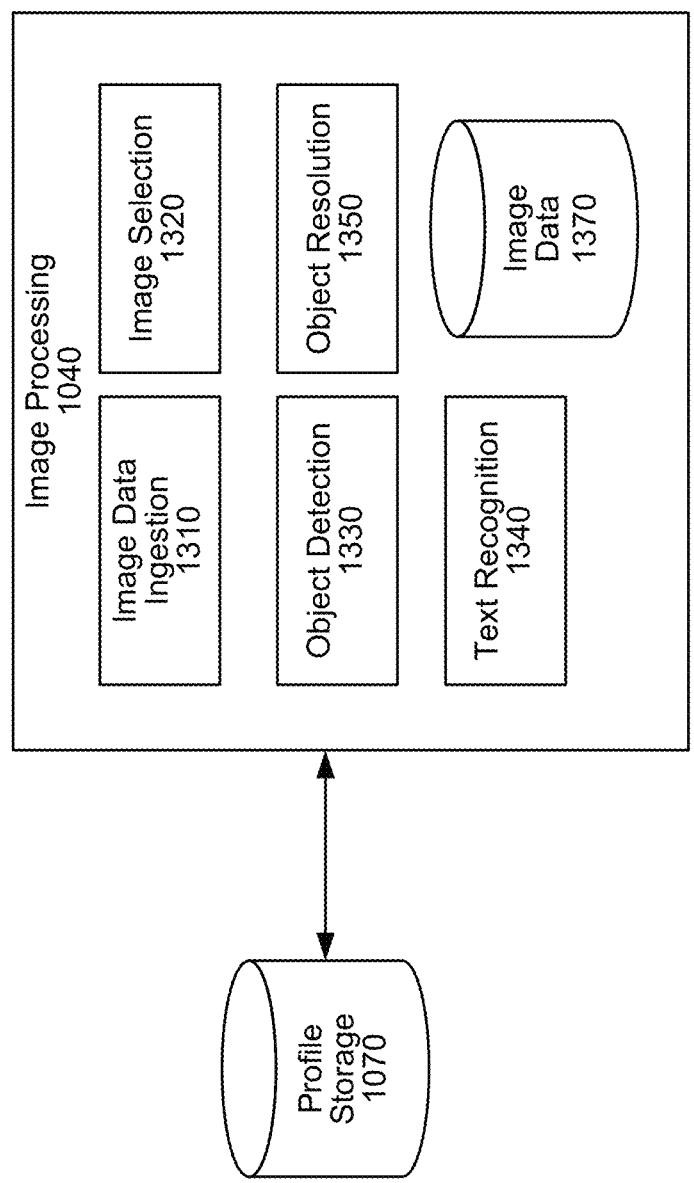
FIG. 13 is a conceptual diagram of components of an image processing component, according to embodiments of the present disclosure.
Figure 17:
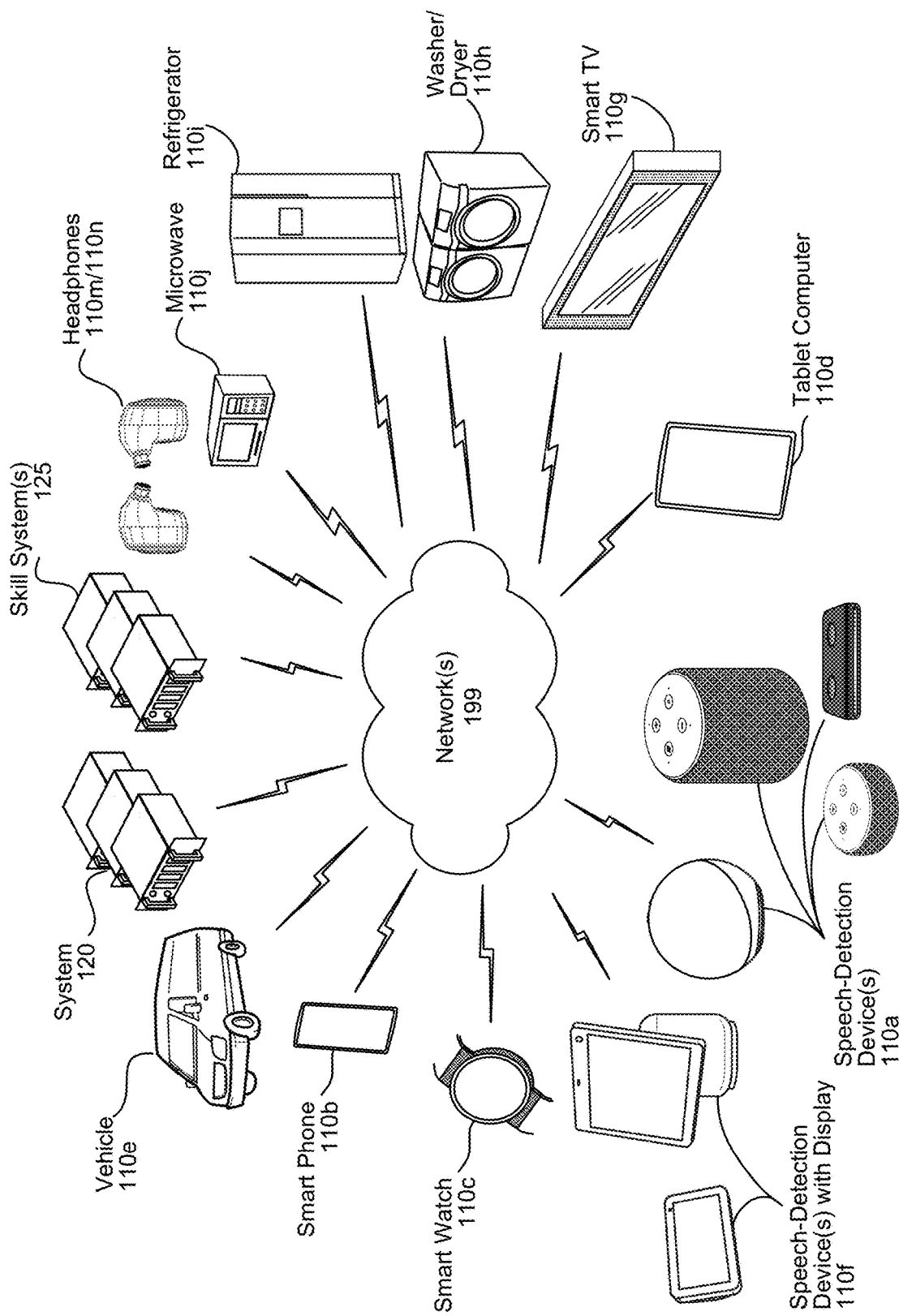
FIG. 17 illustrates an example of a computer network for use with the overall system, according to embodiments of the present disclosure.

Examples of various devices 110 (e.g., the device 110f) are further illustrated in FIG. 17 and may be implemented in the system 100 in place of or in addition to the device 110f. The device 110 and/or the system 120 may include an image processing component 1340 as shown in FIG. 13 which may perform computer vision functions such as object recognition, modeling, reconstruction, etc. For example, the image processing component 1340 may detect a person, face, etc. (which may then be used to perform certain other analysis). The image processing component 1340 is described in greater detail below with regard to FIG. 13.

As illustrated in FIG. 1, an environment 20 of the device 110 may include separate sound sources. For example, FIG. 1 illustrates that the environment 20 may include a first user 5a at a first location (e.g., first direction relative to the device 110), a second user 5b at a second location (e.g., second direction relative to the device 110), a third user 5c at a third location (e.g., third direction relative to the device 110), a pet 10 at a fourth location (e.g., fourth direction relative to the device 110), and/or an appliance such as washer/dryer 110h at a fifth location (e.g., fifth direction relative to the device 110). At various times, each of the sound sources may generate audible noises that may be represented in the raw input audio data generated by the device 110.

The operations shown in FIG. 1 (and other operations described herein) may be described as being performed by the system 120, but this is for illustrative purposes only as the operations may also be performed by the device 110 or by a combination of the device 110 and the system 120. Further, referring to FIG. 2, the some or all of the components shown in FIG. 2 for implementing the techniques and features described herein may be located in the device 110 or in the system 120.

The system 120 may receive (150) first data (e.g., raw input audio data) corresponding to audio captured by the microphone array (e.g., of the device 110). The device 110 may send the raw input audio data to the system 120 via an application that is installed on the device 110 and associated with the system 120. An example of such an application is the Amazon Alexa application that may be installed on a smart phone, tablet, or the like. The device 110 may also receive output data from the system 120, and generate a synthesized speech output. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example, a home server located in a same residence as device 110). The system 120 may also include some combination thereof, for example where certain components/operations are performed via a home server(s) and others are performed via a geographically remote server(s).

Figure 2:
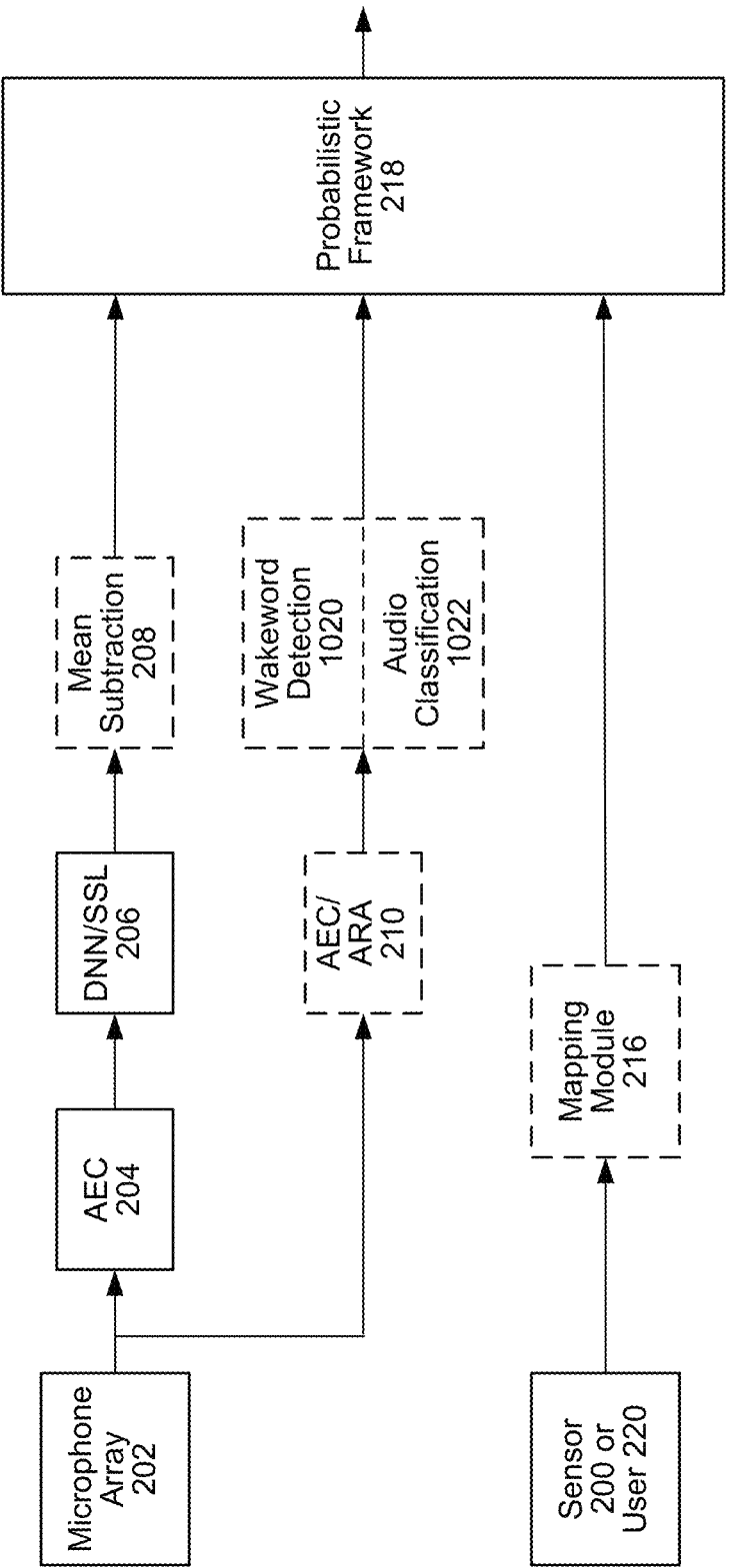
FIG. 2 is a block diagram illustrating example operations according to embodiments of the present disclosure.

The raw input audio data may correspond to or include a representation of an utterance or speech made by, for example, the first user 5a. Referring to FIG. 2, a block diagram illustrating example operations according to embodiments of the present disclosure is shown. Continuing with the example described above, the microphone array of the device 110 may be the microphone array 202 of FIG. 2.

In some examples, the device 110 may receive playback audio data and may generate output audio corresponding to the playback audio data using the one or more loudspeaker(s). While generating the output audio, the device 110 may capture raw input audio data using the microphone array 114. In addition to capturing speech (e.g., raw input audio data that includes a representation of speech from, for example, the first user 5), the device 110 may capture a portion of the output audio generated by the loudspeaker(s), which may be referred to as an "echo" or echo signal. The device 110 may isolate the speech in the raw input audio data by performing acoustic echo cancellation (AEC) to remove the echo signal from the raw input audio data. For example, conventional acoustic echo cancellation may generate a reference signal based on the playback audio data and may remove the reference signal from the raw input audio data to generate isolated input audio data (e.g., representing the speech). Thus, in some embodiments, the microphone array 202 may send the raw input audio data to an AEC module 204, which may receive the raw input audio data from the microphone array 202 and perform AEC on the raw input audio data to generate isolated input audio data. The isolated input audio data generated by the AEC may be referred to herein as first data, although the disclosure is not limited thereto. For example, in some embodiments the AEC module 204 may not be included and the raw input audio data may be passed directly to a DNN/SSL module 206 as the first data for processing without departing from the disclosure.

As discussed above, the systems and methods described herein may include and/or utilize neural networks to process audio data. A neural network may be a computing system that includes a plurality of nodes that process an input and produce an output in accordance with one or more weights. The neural network may be trained using training data, as described in greater detail below with reference to FIG. 9. In some embodiments, the systems and methods described herein for probabilistic SSL may use a convolutional neural network (CNN), which may include convolution functions. The systems and methods described herein may additionally or alternatively include a deep neural network (DNN), which may include one or more hidden layers. A CNN may be a type of DNN and both are examples of a "feedforward" neural network in that, while each node in a layer of the network may be connected to each and every node in a preceding or subsequent layer (e.g., a "fully connected" neural network), the feedforward neural network may not include any connections that loop back from a node in a layer to a previous layer. A neural network that includes such "recurrent" connections is called a recurrent neural network (RNN).

Figure 3:
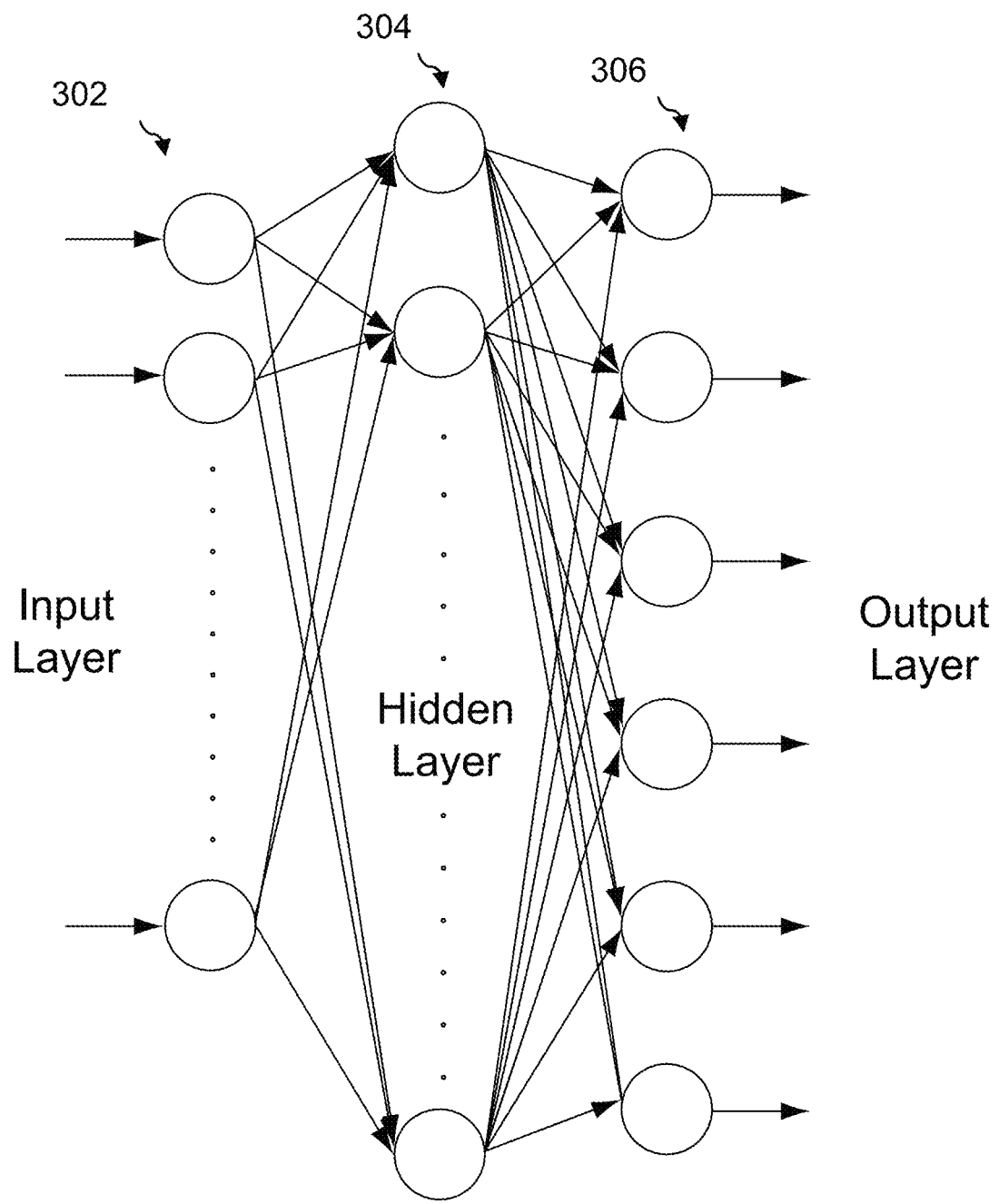
FIG. 3 illustrates an example neural network in accordance with embodiments of the present disclosure.

Neural networks may be used to perform audio processing as described herein. An example neural network in accordance with embodiments of the present disclosure, which may be a CNN and/or DNN, is illustrated in FIG. 3. The neural network may include nodes organized as an input layer 302, a hidden layer 304, and an output layer 306. The input layer 302 may include m nodes, the hidden layer 304 may include n nodes, and the output layer 306 may include o nodes, where m, n, and o may be any numbers and may represent the same or different numbers of nodes for each layer. Nodes of the input layer 302 may receive inputs, and nodes of the output layer 306 may produce outputs. Each node of the hidden layer 304 may be connected to one or more nodes in the input layer 302 and one or more nodes in the output layer 304. Although the neural network illustrated in FIG. 3 includes a single hidden layer 304, other neural networks may include multiple middle layers 304; in these cases, each node in a hidden layer may connect to some or all nodes in neighboring hidden (or input/output) layers. Each connection from one node to another node in a neighboring layer may be associated with a weight or score. A neural network may output one or more outputs, a weighted set of possible outputs, or any combination thereof.

Figure 4:
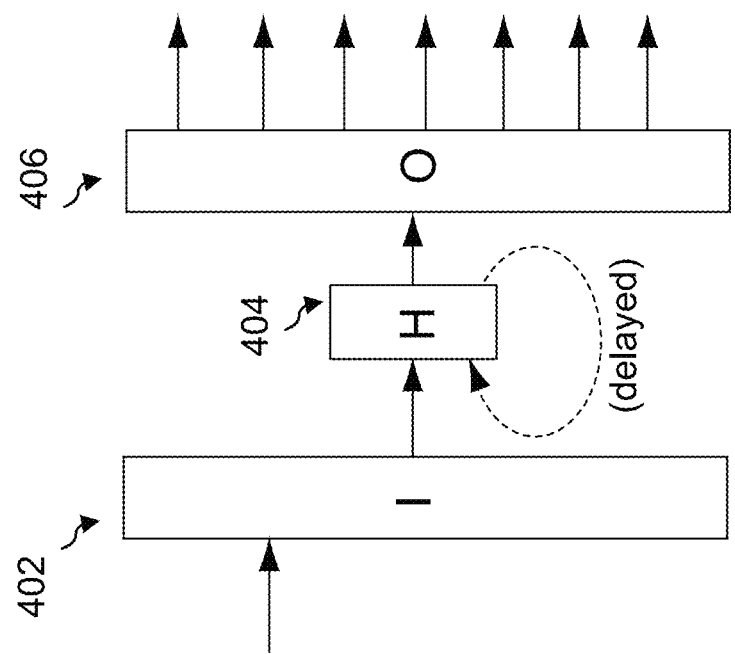
FIG. 4 also illustrates an example neural network in accordance with embodiments of the present disclosure.

In one aspect, the neural network may be constructed with recurrent connections such that the output of the hidden layer of the network feeds back into the hidden layer again for the next set of inputs. Such a neural network is illustrated in FIG. 4, which illustrates an example neural network in accordance with embodiments of the present disclosure. Each node of the input layer 402 may connect to each node of the hidden layer 404. Each node of the hidden layer 404 may connect to each node of the output layer 406. As illustrated, the output of the hidden layer 404 may be fed back into the hidden layer for processing of the next set of inputs. As discussed above, a neural network incorporating recurrent connections may be referred to as a recurrent neural network (RNN). Nodes of an RNN may be, for example, long short-term memory (LSTM) nodes or gated recurrent unit (GRU) nodes.

Processing by a neural network may be determined by the learned weights on each node input and the structure of the network. Given a particular input, the neural network may determine the output one layer at a time until the output layer of the entire network is calculated. Connection weights may be initially learned by the neural network during training, where given inputs may be associated with known outputs. In a set of training data, a variety of training examples may be fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

A neural network, such as a DNN, may be used to process audio data in accordance with various aspects of the present disclosure to achieve improved SSL capability as described herein. For example, referring to FIG. 1, the system 120 may process the first data (e.g., audio data which may include the raw input audio data or the isolated input audio data as discussed above) using a DNN to determine second data. The second data may include a first value corresponding to a first direction and a second value corresponding to a second direction. The first value may correspond to a first probability that audio captured by the microphone array originated from the first direction. The second value may correspond to a second probability that the audio originated from the second direction. In this way, the system 120 may determine (152), using the first data, second data. The second data may include the first value that corresponds to the first probability that the audio captured by the microphone array originated from the first direction and the second value that corresponds to the second probability that the audio originated from the second direction Referring to FIG. 2, in some embodiments, the DNN/SSL module 206 may receive isolated input audio data from the AEC 204 module and further process the isolated input audio data. The DNN/SSL module 206 may output a vector that may include the first plurality of values. One or more of the values, or in some embodiments, each of the values, may correspond to a direction (e.g., of the plurality of directions) relative to the microphone array 202 or the device 110. The number of directions may be configurable based on precision and/or accuracy considerations for SSL performance.

Figure 5:
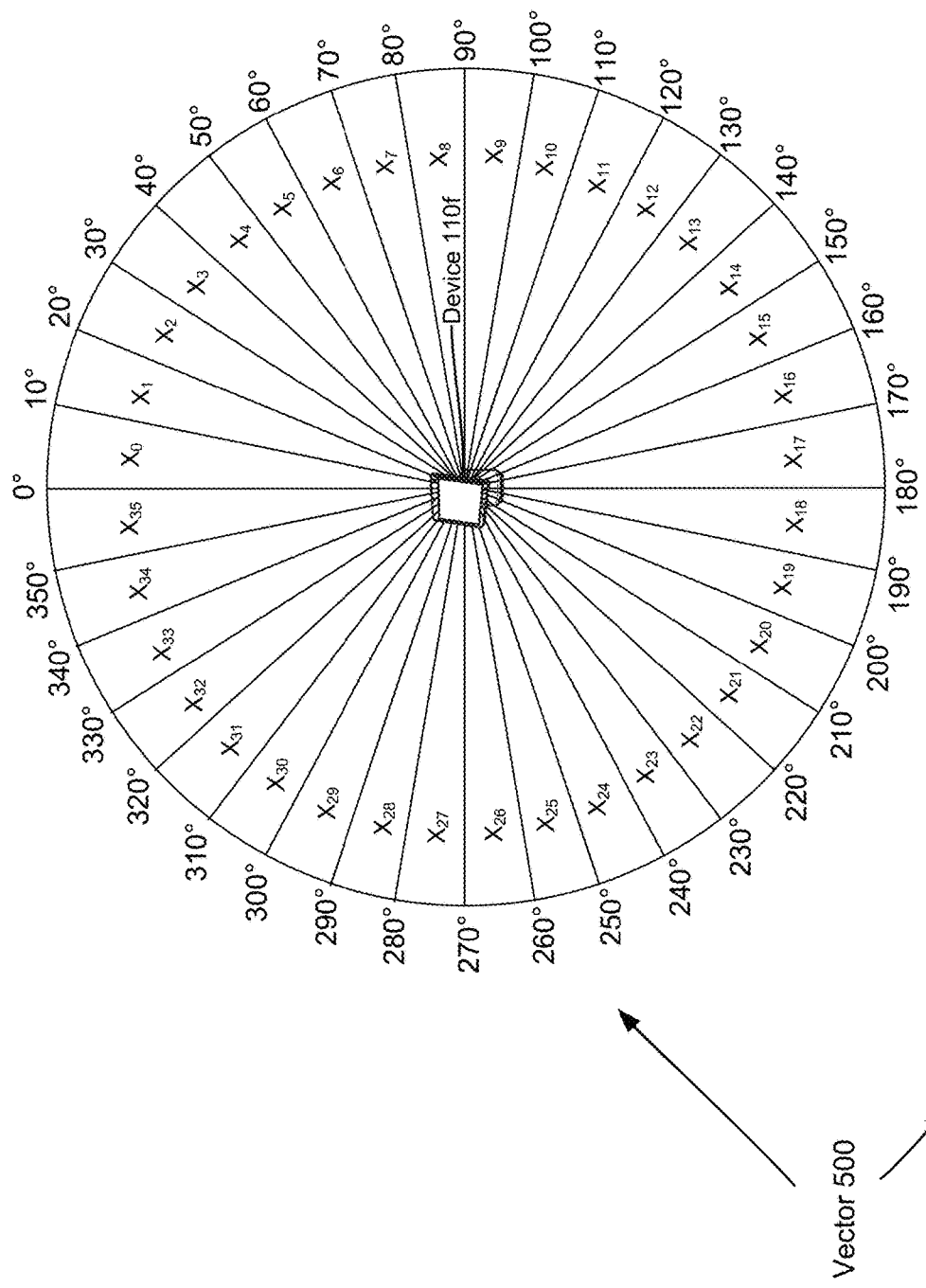
FIG. 5 is a graphic illustrating an example vector in accordance with embodiments of the present disclosure.

Referring to FIG. 5, a graphic illustrating an example vector 500 in accordance with the present disclosure is shown. In some embodiments, the DNN/SSL module 206 may output a 36-dimensional vector for 160 ms (e.g., 20 audio frames at 8 ms each) of audio data, although the disclosure is not limited there. The vector 500 may provide a value for each direction relative to the microphone array 202 or the device 110. For example, the vector may subdivide 360 degrees around the microphone array 202 or the device 110 into 10-degree increments $X_0$-$X_{35}$ (e.g., 36 bins). Each value $X_0$-$X_{35}$ may correspond to a probability that an SSL event (e.g., a wakeword uttered or other audio detected) originated from the corresponding direction. For example, as shown in FIG. 5, the value $X_2$ may correspond to the 20-30-degree direction. Thus, if the value $X_2$ represents the highest probability for the originating direction of the SSL event relative to the microphone array 202 or the device 110, it may be determined (e.g., after further processing) that the SSL event originated from the 20-30-degree direction relative to the microphone array 202 or the device 110 without departing from the disclosure. It should be noted that FIG. 5 is provided for illustrative purposes only and the vector 500 may include any number of dimensions that may correspond to a different number of directional subdivisions (e.g., resolution) around the microphone array 202 or the device 110. For example, in some embodiments, the vector 500 may be an 8-dimensional vector and may subdivide 360 degrees around the microphone array 202 or the device 110 into 45-degree increments $X_1$-$X_8$. Further, in some embodiments, the resolution may be magnitudes greater than 36 (e.g., approaching infinity) and a regression analysis may be performed. In some embodiments, the DNN/SSL module 206 may output raw data that may be passed on for further processing.

Further, in some embodiments, the DNN/SSL module 206 may output the raw data (e.g., corresponding to values $X_0$-$X_{35}$) to a mean subtraction module 208. As discussed above, the DNN/SSL module 206 may operate on 160 ms (e.g., 20 audio frames at 8 ms each) of audio data, although the disclosure is not limited thereto. It should be noted that the 160 ms audio frame is discussed for illustrative purposes only and the audio frames processed in accordance with the systems and methods provided herein may be of a different length of time. To account for noise sources (e.g., from appliances such as washer/dryer 110*h*), which may be more spatially-stationary (e.g., noise that has minimal change over time) than speech, a mean subtraction may be performed on each value (e.g., values $X_0$-$X_{35}$ or each of the 36 bins) received from the DNN/SSL module 206. In this way, the mean subtraction module 208 module may remove spatially-stationary noise from more than one noise source as more than one of the 36 bins may represent a noise source from a corresponding direction. The mean subtraction may be performed by the mean subtraction module 208, which may receive the raw data from the DNN/SSL module 206 and perform the mean subtraction on the 36 bins prior to passing the output of the DNN/SSL module 206 to the probabilistic framework component 218.

It should be noted that the mean subtraction operation and the mean subtraction module 208 are discussed for illustrative purposes only and in some embodiments, the DNN/SSL module 206 may provide output to the probabilistic framework component 218 without performing mean subtraction. For example, in some embodiments, the DNN of the DNN/SSL module 206 may be trained to adjust for spatially-stationary noise sources and to output values $X_0$-$X_{35}$ where the effects of the spatially-stationary noise sources may be removed.

Some noise sources may not be spatially-stationary. For example, referring to FIG. 1, while audio originating from the washer/dryer 110h may be spatially-stationary, audio originating from the pet 10, the second user 5b (e.g., non-wakeword speech), and/or the third user 5c (e.g., non-wakeword speech) may not be spatially-stationary and thus may not be subtracted from the output of the DNN/SSL module 206 by mean subtraction. Thus, audio originating from the pet 10, the second user 5b, and/or the third user 5c may be noise sources originating from particular directions that may complicate determining SSL for an uttered wakeword. The techniques and features for informing SSL based on wakeword boundary (e.g., time-related) data and/or computer vision data (or other sensor data) described below may account for these types of noise sources originating from particular directions.

For example, a number of audio events may occur in, the environment 20, including noise events from appliances such as washer/dryer 110h or pet 10. An SSL event may correspond to utterance of a wakeword (e.g., by the first user 5a) or other audio spoken by, for example, users 5b and/or 5c. In some embodiments, the probabilistic framework component 218 may be configured to perform operations for SSL for uttered wakewords. In such embodiments, the systems and methods described herein may receive (e.g., by the probabilistic framework component 218) time-related data for uttered wakewords from a wakeword detector 1020. The time-related data may include start and end timestamps for SSL events (e.g., corresponding to wakewords uttered or other audio) and the probabilistic framework component 218 may store the SSL events in, for example, a timeline. The start and end timestamps may be used by the probabilistic framework component 218 to filter out SSL events that fall outside a wakeword time frame (e.g., three to five 160 ms audio frames).

For example, the DNN of the DNN/SSL module 206 may produce an SSL estimate every 160 ms, however not all of those estimates correspond to speech or target audio. Thus, in order to focus on the audio frames that include relevant data, the probabilistic framework component 218 may process audio frames corresponding to times for which wakewords are determined to have been uttered, based on the time-related data from the wakeword detector 1020, as discussed above.

It should be noted that while the probabilistic framework component 218 may be discussed herein, for illustrative purposes, as performing SSL for wakewords uttered, the probabilistic framework component 218 may also be configured to perform SSL for any audio (instead of or in addition to wakewords). In such embodiments, the systems and methods described herein may receive (e.g., by the probabilistic framework component 218) time-related data for audio classified by an audio classifier 1022. It should also be noted that while FIG. 2 includes the wakeword detector 1020 and/or the audio classifier 1022, this is for illustrative purposes only, and in some embodiments the wakeword detector 1020 and/or the audio classifier 1022 may not be included or may not be utilized. For example, the DNN/SSL module 206 may be trained to determine the time-related data for uttered wakewords or other audio for which SSL operations are to be performed. For example, the DNN/SSL module 206 may have an additional output (e.g., a 37th value) which may correspond to a probability of whether a wakeword was uttered (or other audio was produced) for a time corresponding to a particular audio frame or for a time within a particular audio frame.

Further, in some embodiments, the DNN/SSL module 206 may be trained to perform SSL operations for other audio produced besides wakeword utterances or other spoken audio, such as dog barking, breaking glass, etc., where the additional output (e.g., the 37th value) provides similar time-related data and probabilities. For example, the DNN may be trained to perform speech and/or noise classification and may provide data related to the speech and/or noise classification such as time-related information that may indicate boundaries in time for the audio. In other words, the DNN/SSL module 206 may classify speech and/or noise in addition to or alternatively to the wakeword detector 1020 and/or the audio classifier 1022, and may thus provide the time-related information to the probabilistic framework component 218.

As shown in FIG. 2, in embodiments including the wakeword detector 1020 and/or the audio classifier 1022, raw input audio data received from the microphone array 202 may be processed by an AEC/ARA (adaptive reference algorithm) module 210. The AEC of AEC/ARA module 210 may be performed as discussed above with regard to AEC 204. As an alternative to generating the reference signal based on the playback audio data, ARA processing may generate an adaptive reference signal based on the raw input audio data. To illustrate an example, the ARA processing may perform beamforming using the raw input audio data to generate a plurality of audio signals (e.g., beamformed audio data) corresponding to particular directions (which may be unrelated the directions discussed above regarding DNN/SSL module 206). For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform AEC by removing the reference signal from the target signal. As the raw input audio data is not limited to the echo signal, the ARA processing may remove other acoustic noise represented in the raw input audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure.

For example, the device 110 may include an adaptive beamformer and may be configured to perform AEC/ANC/AIC using the ARA processing to isolate the speech in the raw input audio data. The adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values or signal quality metrics (e.g., signal-to-noise ratio (SNR) values, average power values, etc.), and/or using other techniques or inputs, although the disclosure is not limited thereto. As an example of other techniques or inputs, the device 110 may capture video data corresponding to the raw input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time. It should be noted that this discussion of AEC/ARA is to illustrate pre-processing of raw input audio data by the AEC/ARA module 210 for the wakeword detector 1020 and/or the audio classifier 1022 which provide the time-related data to the probabilistic framework component 218, and otherwise may be unrelated to the SSL techniques and features described herein as they relate to the DNN/SSL module 206 and the probabilistic framework component 218.

In some embodiments, in addition to receiving the output from the DNN/SSL module 206 (e.g., values $X_0$-$X_{35}$, which in some cases may be processed by the mean subtraction module 208) and/or the time-related data from the wakeword detector 1020 and/or audio classifier 1022, as described above, the probabilistic framework component 218 may also receive computer vision data. The computer vision data (or other sensor data) may be output from the device 110, which may be a camera-enabled device, and may be processed by the mapping module 216. The computer vision data may include image/video data, motor position data, or other data related to images captured by the one or more camera sensors of the device 110.

As discussed above, in some embodiments, one or more of the mapping module 216, the AEC module 204, the DNN/SSL module 206, the mean subtraction module 208, the AEC/ARA module 210, the wakeword detector 1020, the audio classifier 1022, and/or the probabilistic framework component 218 may be components of the system 120. Further, in some embodiments, one or more of the mapping module 216, the AEC module 204, the DNN/SSL module 206, the mean subtraction module 208, the AEC/ARA module 210, the wakeword detector 1020, the audio classifier 1022, and/or the probabilistic framework component 218 may be components of device 110. Additionally, in some embodiments, one or more of the mapping module 216, the AEC module 204, the DNN/SSL module 206, the mean subtraction module 208, the AEC/ARA module 210, the wakeword detector 1020, the audio classifier 1022, and/or the probabilistic framework component 218 may be components of the device 110 and one or more of the mapping module 216, the AEC module 204, the DNN/SSL module 206, the mean subtraction module 208, the AEC/ARA module 210, the wakeword detector 1020, the audio classifier 1022, and/or the probabilistic framework component 218 may be components of the system 120.

In some embodiments, the DNN/SSL module 206 may perform SSL by receiving the multichannel audio data from the microphone array (e.g., of the device 110), determining a probability (e.g., values $X_0$-$X_{35}$) that the audio (e.g., the wakeword uttered or the other audio produced) originated from one or more directions (e.g., 10-degree increments corresponding to $X_0$-$X_{35}$) based on the multichannel audio data, and determining that the direction corresponding to the greatest probability is the direction from which the audio originated. Further, mean subtraction may remove the effects of spatially-stationary noise, which may reduce the likelihood that the DNN/SSL module 206 determined the direction from which the audio originated in error due to the effect of the spatially-stationary noise. However, as discussed below, the techniques and features provided by the present disclosure may allow for improvement in SSL by using computer vision data (or other sensor data) to inform the determination of SSL.

Referring to FIG. 1, the system 120 may receive (154) third data (e.g., from the sensor 200). The third data may correspond to input from the sensor 200. The sensor 200 may be part of a device such as the device 110 but the disclosure is not limited thereto as the sensor 200 may be a standalone sensor or may be part of another device. The sensor may be a proximity sensor, presence sensor, image sensor (e.g., camera), temperature sensor, location sensor, ultrasound sensor, and/or Bluetooth or other wireless component (that may detect other devices, e.g., a user wearable device). In some embodiments, the third data may be the computer vision data (or other sensor data). Referring to FIG. 2, in some embodiments, the computer vision data may be processed by the mapping module 216 to create mapping data that may be used by the probabilistic framework component 218. In some embodiments, the mapping module 216 may be a component of the device 110 and/or a subcomponent of the probabilistic framework 218 component. The mapping module 216 may output mapped computer vision data. The mapped computer vision data may include one or more of an obstacle map, a heatmap, and a field of view map, which may be representations as described below with reference to FIGS. 7 and 8.

Figure 6:
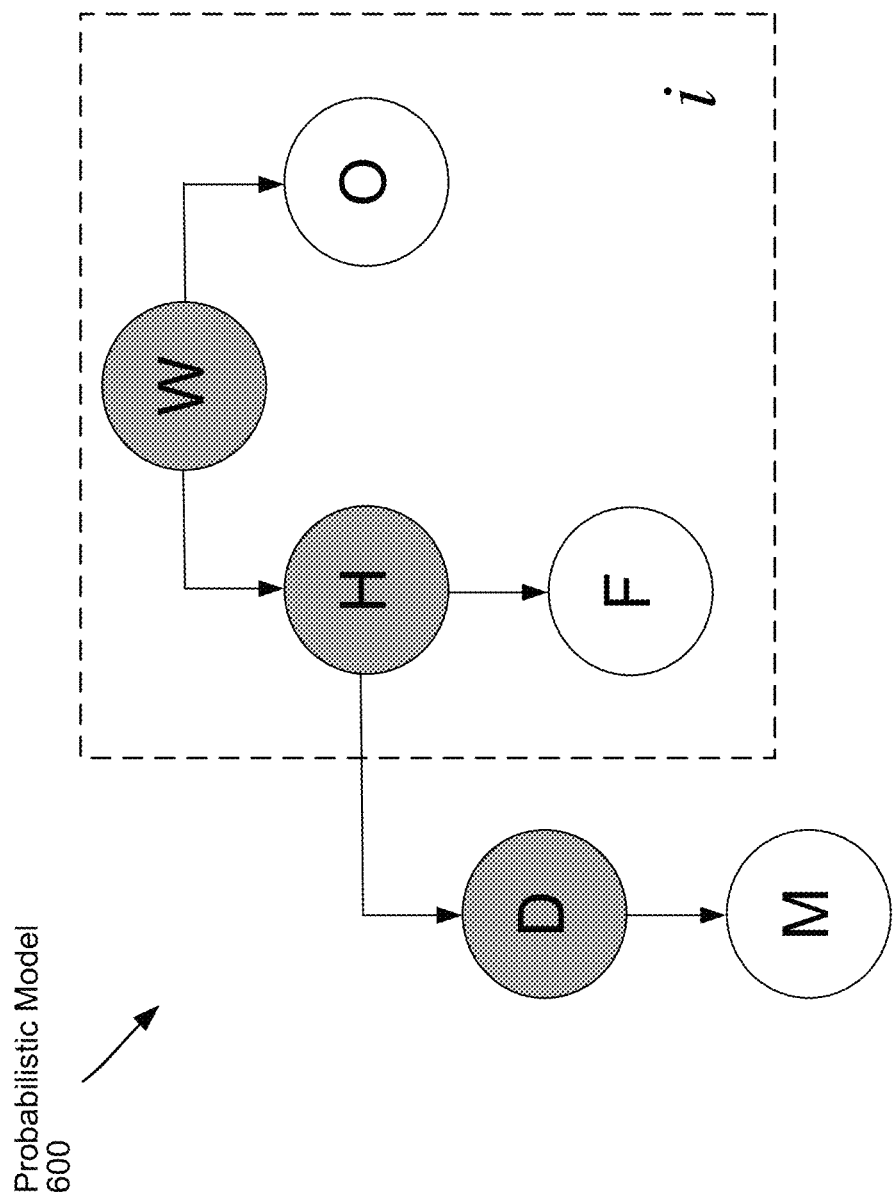
FIG. 6 is an illustration of an example probabilistic model, according to embodiments of the present disclosure.

The probabilistic framework component 218 may use one or more of the DNN/SSL module 206 output (e.g., the values $X_0$-$X_{35}$ with or without mean subtraction), the time-related data from the wakeword detector 1020 and/or the audio classifier 1022, and/or the mapped computer vision data from the mapping module 210 to determine a probabilistic model. Referring to FIG. 6, an illustration of an example probabilistic model 600, according to embodiments of the present disclosure, is shown. For example, the probabilistic framework component 218 may use the DNN/SSL module 206 output and the computer vision data or mapped computer vision data from the mapping module 210 to determine the probabilistic model 6. As will be discussed in greater detail below, based on the second data (e.g., the values $X_0$-$X_{35}$ with or without mean subtraction) and the third data (e.g., the computer vision data or mapped computer vision data), the system 120 may determine (156) a third probability that the audio captured by the microphone array originated from a first direction (e.g., a 10-degree increment corresponding to one of $X_0$-$X_{35}$) of the plurality of directions (e.g., 0-360 degrees), and a fourth probability that the audio originated from the second direction. Further, based at least in part on the third probability being greater than the fourth probability, the system 120 may determine (158) that the audio originated from the first direction.

The probabilistic framework component 218 may determine one or more variables as part of the probabilistic model 6. For example, the probabilistic framework component 218 may determine a Boolean variable $W_i \in \{0,1\}$ which may represent whether a wall or other nearby obstruction exists (1) or does not exist (0) in a direction i. Further, a probabilistic framework component 218 may determine a Boolean variable $O_i \in \{0,1\}$ which may represent whether an obstacle exists (1) or does not t exist (0) in direction i. The probabilistic framework component 218 may also determine a Boolean variable $H_i \in \{0,1\}$ which may represent whether a human exists (1) or does not exist (0) in direction i. Additionally, the probabilistic framework component 218 may determine a Boolean variable $F_i \in \{0,1\}$ which may represent whether a human is detected in the field of view (FOV) in direction i. The FOV may be an area (e.g., a wedge-shaped area) that may be visible by the camera sensor(s) (e.g., the one or more camera sensors of the device 110). In some embodiments, the probabilistic model may correspond to a Dynamic Bayesian Network (DBN) which may be a graphical model based on observed variables and latent variables. Further, in some embodiments, if a human is not detected in the FOV and a direction corresponding to the highest probability indicates that the audio originated from that direction, but the probability does not indicate or reflect that a human is present in that direction, the FOV may be changed (e.g., by 5, 10, 15 degrees, etc.) by operating a motor associated with the sensor 200 and/or the device 110.

One or more of the Boolean variables described above may be organized in the illustration of the example probabilistic model 600 shown in FIG. 6. The variables $W_i$, $O_i$, $H_i$, and $F_i$ may be considered Boolean variables on a per-direction basis (e.g., in direction i) because walls, obstacles, and/or humans may exist in multiple directions simultaneously. Other variables may also be included. For example, the probabilistic framework component 218 may determine a variable $D \in \{0, 1, \ldots 35\}$ which may represent a source direction for the wakeword uttered (or the other audio produced). Further, the probabilistic framework component 218 may determine a variable M (multichannel audio) which may represent microphone signals received. The shaded circles in the example probabilistic model 600 (e.g., W, H, and D) may represent latent variables that may not be observed directly (e.g., wall/obstruction out of field of view, human out of field of view, and source direction).

The variable may be a single direction from which the wakeword originated. Assuming that only one wakeword is uttered, 'D' may represent a value from 0 to 35. The probabilistic framework component 218 may be configured to determine the most likely direction from which the wakeword originated given the observable data available. For example, the probabilistic framework component 218 may be configured to determine a direction that maximizes a likelihood $P(M=m, F=f, O=o \in D=d)$ which may be conditioned on observations of m, f, and o, given reasonable prior data. The output of the DNN/SSL module 206 may be interpreted as providing a likelihood function that evaluates PMF'P(M=m|D=d)' for each direction 'd', given the observed microphone signals 'm'.

The probabilistic framework component 218 may determine one or more relationships for the probabilistic model 600. For example, the probabilistic framework component 218 may determine the relationship $P(O\_i=o|W\_i=w)$, which may correspond to a probability of an obstacle being mapped given whether or not there is actually an obstacle (e.g., a wall) in the direction i, and may be given by a false accept rate (FAR) and a false reject rate (FRR) of the obstacle map. FAR may refer to a probability of reporting that an event happened given that it did not happen. FRR may refer to a probability of reporting an event did not happen, given that it did happen. The FAR/FRR values may be unknown and may be estimated based on historical data, but it may be preferable to determine the FAR/FRR values from field-based data if available.

Further, the probabilistic framework component 218 may determine the relationship $P(H\_i=h|W\_i=w)$, which may correspond to a probability of a human being present given whether or not there is actually a wall in the direction i, and may be set to 0 if there is a wall because a human could not be present if there is a wall. If it is determined that there is no wall in direction i, this probability may be set based on a computer vision heatmap (discussed further below with reference to FIGS. 7 and 8). For this purpose, W may be treated as absolute because a probability that the obstacle map (discussed further below with reference to FIGS. 7 and 8) is incorrect may be handled separately by the model.

The probabilistic framework component 218 may also determine the relationship $P(F\_i=f|H\_i=h)$, which may correspond to a probability that a human is detected in the computer vision data given whether or not the human is actually present in the direction i, and may be is set to 0 if the direction i is outside the FOV (e.g., of the camera sensor(s) of the device 110), because the human could not be detected by the camera if the human is outside the FOV. If the direction i is within the FOV of the camera sensor(s), this probability may be determined based on the FAR and FRR of a computer vision entity detector. The FAR/FRR values may be unknown and may be estimated based on historical data, but it may be preferable to determine the FAR/FRR values based on real data.

The probabilistic framework component 218 may additionally determine the relationship $P(D=d|H=h)$, which may correspond to a probability that the wakeword came from a particular direction given locations determined to have humans present. This probability may be conditioned on all the presence variables H_i as it may be assumed that the wakeword is equally likely to originate from any human near the device (e.g., the device 110). Thus, this probability may be determined as $P(D=d|H=h)=p\_d/sum(H)$. Further, the relationship $P(M=m|D=d)$ may be based on output of the DNN/SSL module 206, where the output may be interpreted as providing a likelihood function for each direction based on observed microphone signals 'm'.

The relationships discussed above determined by the probabilistic framework component 218 and related conditional probabilities may be used to determine a more complete model with one or more parameters. For example, the parameter FRR_o may correspond to an FRR of an obstacle map. Further, the parameter FAR_o may correspond to an FAR of an obstacle map. Also, the FRR_f may correspond to an FRR of a FOV entity map. Additionally, the FAR_f may correspond to an FAR of a FOV entity map. In some embodiments, further computer vision capabilities may provide additional data such as minimum/maximum bounds for heatmap probabilities and confidence values for computer vision entity detection which may be used by the probabilistic framework component 218 to further improve SSL capability.

In some embodiments, when an SSL event is detected (e.g., when a wakeword is uttered or, in embodiments implementing an audio classifier, when other audio is produced), the probabilistic framework component 218 may log computer vision data received. The logged computer vision data may be visualized in real time (or near real time) and may inform operations for SSL. Further, in some embodiments, the probabilistic framework component 218 may include an SSL event handler which may convert and/or format microphone array-relative SSL angles to base-relative angles, and may account for motor position (e.g., of the device 110). The SSL event handler may also add incoming SSL events to a timeline for processing. Additionally, in some embodiments, a post processor module (not shown) may include DNN-specific instructions configured to implement the DNN-based operations described herein, and may convert various data (e.g., output of DNN/SSL module 206, computer vision data, etc.) into probabilities values usable by the probabilistic framework component 218 to perform operations for combining aspects of logged computer vision data received with an SSL distribution to determine a posterior distribution, which may improve SSL by providing a more reliable estimate of the probability for the direction from which the wakeword was uttered (or the other audio was produced).

Figure 7:
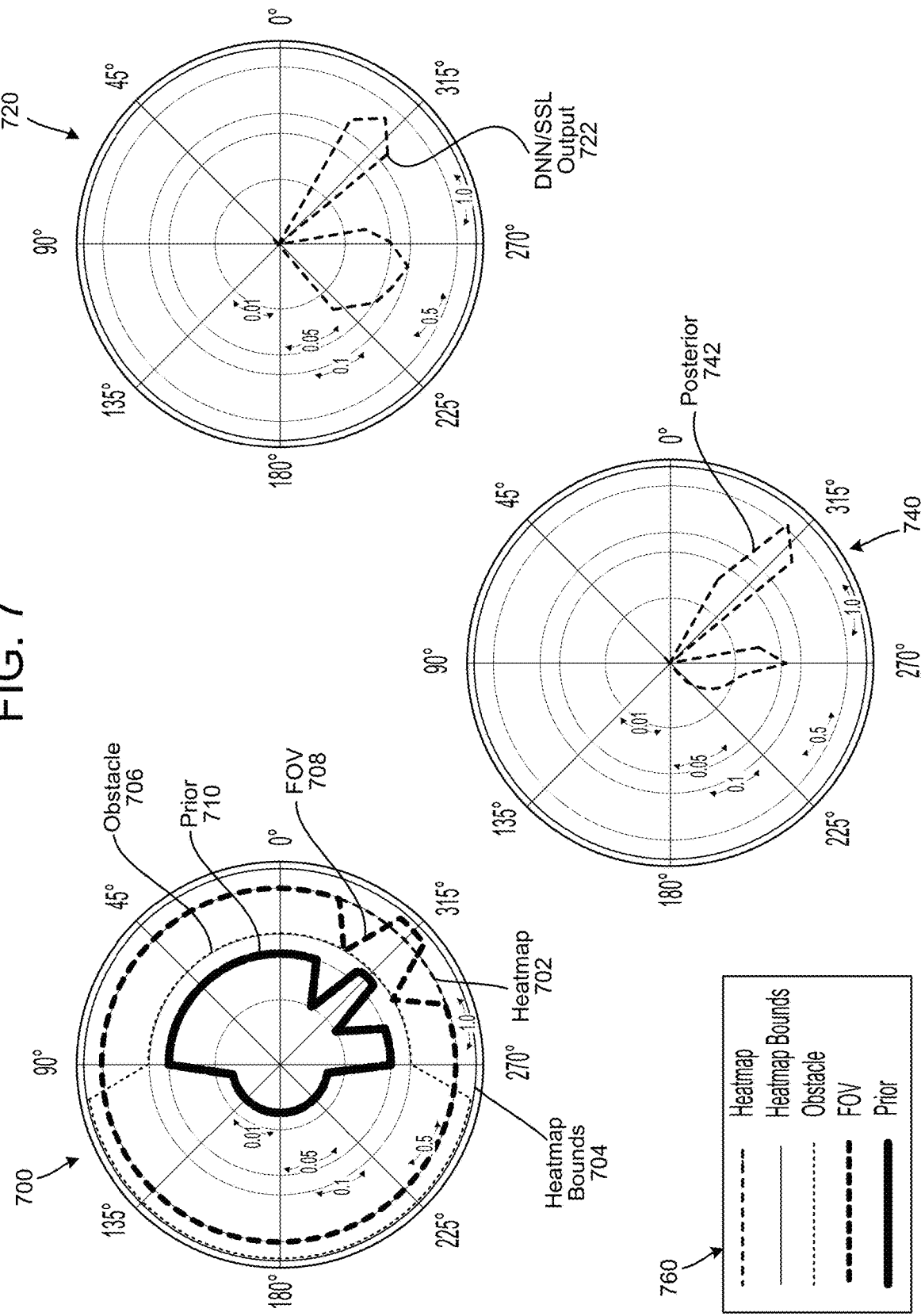
FIG. 7 shows plots illustrating example distributions in accordance with embodiments of the present disclosure.

Referring to FIG. 7, the plots 700, 720, and 740 illustrate example distributions in accordance with embodiments of the present disclosure, where a human has been detected in the FOV. The plots 700, 720, and 740 include concentric circles indicating a probability that a wakeword was uttered (or, in embodiments implementing an audio classifier, when other audio was produced) on 0-1 scale. The values 0.01, 0.05, 0.1, 0.5, and 1.0 have been superimposed on the plots and may each correspond to a concentric circle, where values approaching 0.0 towards the center of the plot (e.g., the plot 700) indicate a smaller probability that the wakeword was uttered (or the other audio was produced) from a corresponding direction, and values approaching 1.0 toward the outside of the plot (e.g., the plot 700) indicate a greater probability that the wakeword was uttered (or the other audio was produced) from a corresponding direction. In some embodiments, a probability of about 0.5 may indicate that there is no useful information for that direction, a probability of 0.1 or less may indicate that there is a low probability of a human being present for that direction, and/or a probability near 1.0 may indicate that there is a high probability of a human being present for that direction. It should be noted that while the probabilities 0.01, 0.05, 0.1, 0.5, and 1.0 are shown between arrows pointing in opposite directions relative to a concentric circle (e.g., of the plot 700), the probabilities 0.01, 0.05, 0.1, 0.5, and 1.0 are intended to indicate high and lower probabilities radially, with smaller probabilities closer to the the center of the plot and larger probabilities toward the outside of the plot.

For example, the plot 700, as indicated by the key 760, shows a heatmap representation 702 illustrating a visualization of the computer vision data. In some embodiments, the heatmap representation indicates directions where humans spend more time based on the computer vision data. The heatmap 702 extends around the plot 700 (the extension cannot be fully seen due to the presence of the representation FOV 708) at 0.5, indicating the probability of 0.5 that the wakeword was uttered for each direction (0-360 degrees) based on the heatmap 702. Thus, in this example, the heatmap 702 does not provide additional information indicating the direction from which the wakeword originated. Further, as indicated by the key 760, a heatmap bounds representation 704 illustrates a visualization of minimum and maximum boundaries of the heatmap, where the minimum is 0 (not shown) and the maximum is 1.

The plot 700, as indicated by the key 760, also shows an obstacle representation 706 (e.g., obstacle map) illustrating a visualization of a probability that an obstacle exists for each direction (0-360 degrees). In this example, the device (e.g., the device 110) may have been positioned against a wall such that directions behind the device (e.g., from about 270 degrees to about 90 degrees clockwise) may have a high probability of including an obstacle (e.g., approaching 1.0 as shown in the plot 700). The probability of an obstacle may be represented as (1-FAR_o) in directions behind the device (e.g., from about 270 degrees to about 90 degrees clockwise). Further, the probability of an obstacle existing in directions in front of the device (e.g., from 90 degrees to 270 degrees clockwise) may be low (e.g., about 0.1 as shown in the plot 700). In some embodiments, the obstacle map may be determined by allowing the device 110 to scan a room (e.g., 360 degrees) during setup or activation of the device (e.g., out of the box) where obstacle data corresponding to the obstacle map may be detected by the sensor 200. Further, in some embodiments, the obstacle data corresponding to the obstacle map may be provided by a user (e.g., the user 220) manually during setup of the sensor 200 and/or the device 110. In other words, the user 220 may provide an indication to the device 110 of one or more directions where there may be obstacles.

The plot 700, as indicated by the key 760, also shows an FOV representation 708 (e.g., FOV map or FOV entity map) illustrating a visualization of a probability that a human is detected for each direction (0-360 degrees), where $P(H\_i=1|F\_i=f)$ is plotted for each direction. For directions outside the FOV of the device (e.g., from about 300 degrees to about 330 degrees clockwise), the computer vision data may not be informative. Thus, the probability that a human is detected for directions outside the FOV of the device (e.g., from about 300 degrees to about 330 degrees clockwise) is 0.5. For directions inside the FOV of the device (e.g., from about 330 degrees to about 300 degrees clockwise) where a human has been detected, the probability that a human is detected may be high, such as approaching 1.0 at about 315 degrees, and may be represented by (1-FAR_f). The direction of 315 degrees may correspond to the direction in which the camera sensor(s) of the device (e.g., the device 110) were focused. In some embodiments, the FOV data may be provided and used by the probabilistic framework component 218 in real time or near real time.

The plot 700, as indicated by the key 760, also shows a prior probability representation 710 illustrating a visualization of an overall result determined from the computer vision data. This result may be plotted as a prior probability P(D) that a human is detected for each direction (e.g., each 10-degree subdivision from 0-360 degrees), where the result is computed as the product $P(H|F)*P(W|O)$ and normalized. The plot 720 shows a representation 722 illustrating a visualization of output of the DNN/SSL module 206 after mean subtraction (e.g., by mean subtraction module 208), which may be referred to as the SSL distribution. The plot 740 shows a representation 742 illustrating a visualization of a posterior distribution after combining (e.g., multiplying) the prior probability P(D) (e.g., determined from the computer vision data as discussed with regard to the representation 710) with the SSL distribution (e.g., corresponding to the representation 722).

Thus, the probabilistic framework component 218 may combine aspects of the logged computer vision data received with the SSL distribution to determine the posterior distribution, which may improve SSL by providing a more reliable estimate of the probability (e.g., greater than 0.5) for the direction (e.g., about 315 degrees) from which the wakeword was uttered (or the other audio was produced). The probabilistic framework component 218 may also determine and provide a confidence level or confidence interval corresponding to the probability. One or more parameters may be tuned to allow for a greater (or lesser) confidence level or confidence interval corresponding to the probability.

Figure 8:
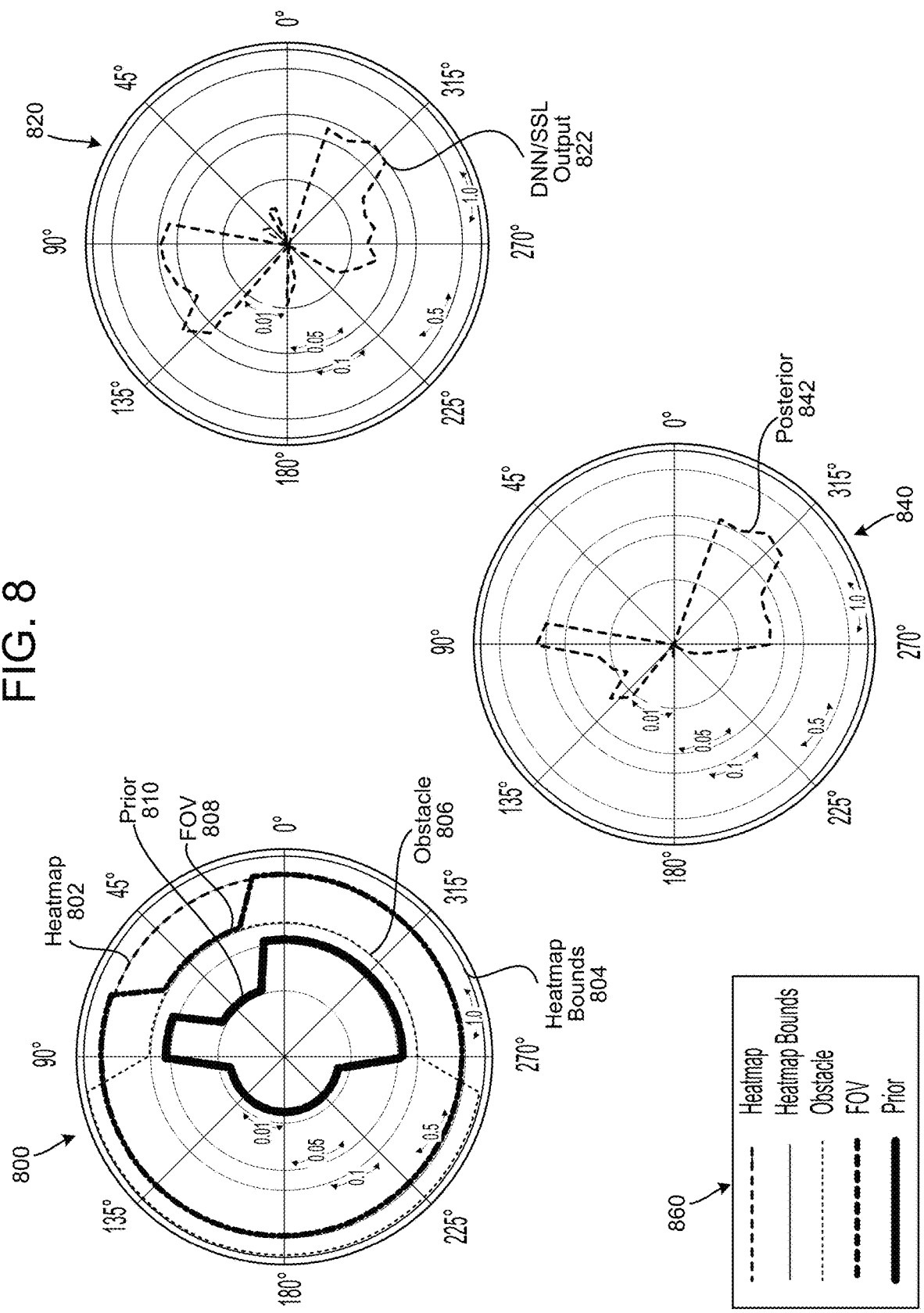
FIG. 8 also shows plots illustrating example distributions in accordance with embodiments of the present disclosure.

Referring to FIG. 8, the plots 800, 820, and 840 illustrate example distributions in accordance with embodiments of the present disclosure, where no human has been detected in the FOV. The heatmap representation 802, the heatmap bounds representation 804, the obstacle representation 806, the FOV representation 808, and the prior probability representation 810 of FIG. 8 may be determined in a similar manner as the heatmap representation 702, the heatmap bounds representation 704, the obstacle representation 706, the FOV representation 708, and the prior probability representation 710 of FIG. 7, respectively (as discussed above), however the determinations may be adjusted based on no human being detected in the FOV and the camera sensor(s) of the device (e.g., the device 110) being focused at about 45 degrees instead of 315 degrees.

For example, referring to the FOV representation 808 of FIG. 8 for directions inside the FOV of the device (e.g., from about 15 degrees to about 75 degrees counter-clockwise) where no human has been detected, the probability that a human exists in the corresponding area may be low, such as approaching about 0.1 and may be represented by (FRR_f). The plot 820 shows a representation 822 illustrating a visualization of output of the DNN/SSL module 206 after mean subtraction (e.g., by mean subtraction module 208), or the SSL distribution. The plot 840 shows a representation 842 illustrating a visualization of a posterior distribution after combining (e.g., multiplying) the prior probability P(D) (e.g., determined from the computer vision data as discussed with regard to the representation 810) with the SSL distribution (e.g., corresponding to the representation 822). Thus, the probabilistic framework component 218 may combine aspects of the logged computer vision data received with the SSL distribution to determine the posterior distribution, which may improve SSL.

In some embodiments, the probabilistic framework component 218 may determine that multiple directions (e.g., corresponding to the values $X_0$-$X_{35}$) have high probabilities of being the direction from which the audio originated. For example, the probabilistic framework component 218 may determine that the values $X_1$ and $X_2$ each correspond to a direction with a high probability of being the direction from which the audio originated. The probabilistic framework component 218 may further determine, based on the computer vision data (or other sensor data) and/or combining aspects of the logged computer vision data or other sensor data) received with the SSL distribution and the determined posterior distribution, which of the directions corresponding to the values $X_1$ and $X_2$ is more likely to be the direction from which the audio originated. Further, in some embodiments, the output of the probabilistic framework component 218 may be sent to another framework (e.g., a smart motion framework) for further analysis.

Figure 9:
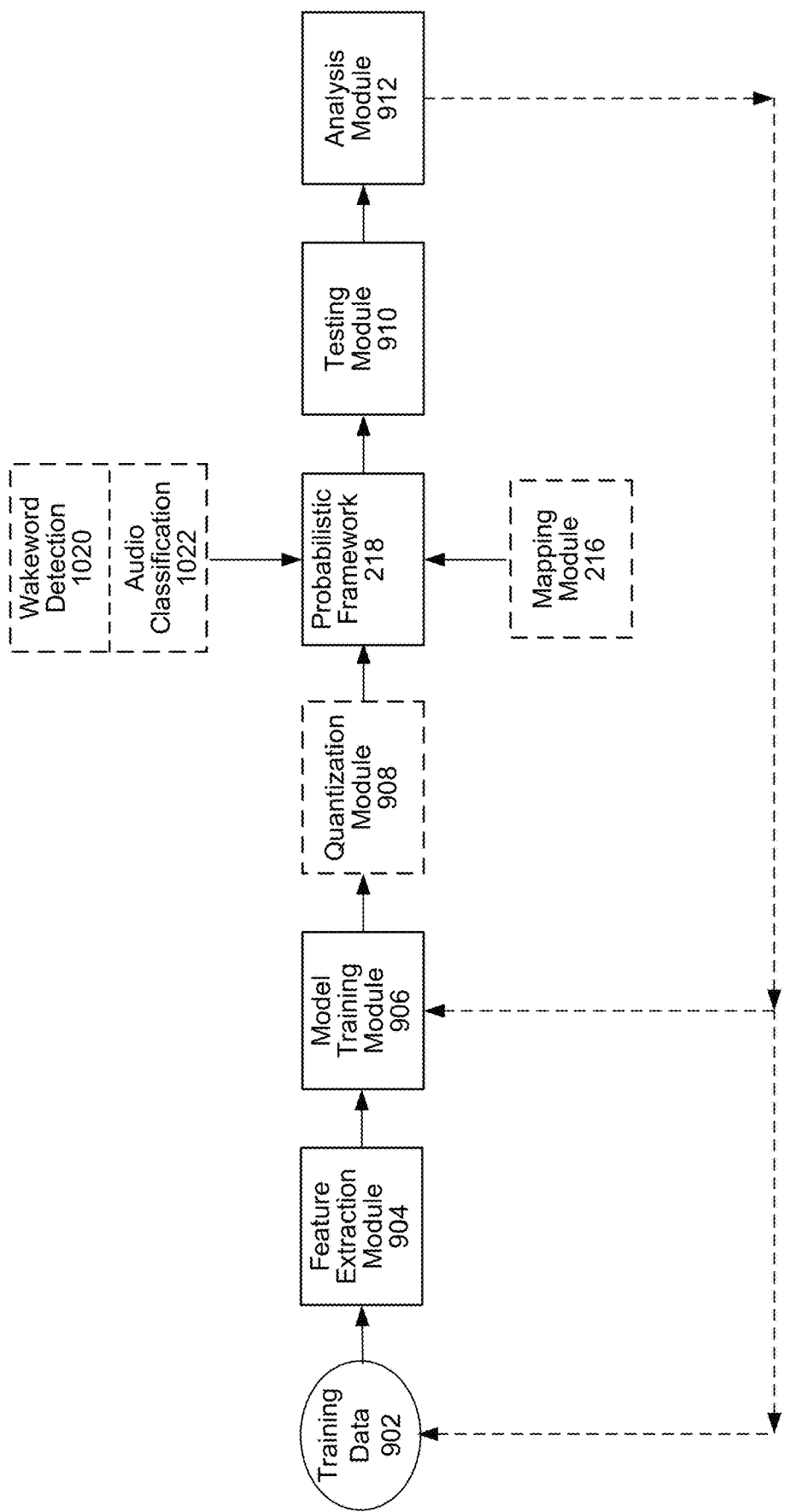
FIG. 9 is a block diagram illustrating example components for training models, according to embodiments of the present disclosure.

Referring to FIG. 9, a block diagram illustrating example components for training models, according to embodiments of the present disclosure, is shown. The DNN of the DNN/SSL module 206 may include a DNN model with an SSL head. The SSL head may be conditioned on VAD labels to learn SSL during speech, where directions corresponding to noise may be filtered out (e.g., by mean subtraction as discussed above). During training of the DNN, loss may be propagated through both the DNN model and the SSL head and a weighted loss may be calculated. Gradients may be back-propagating and weights and biases for shared kernels and hidden layers may be adjusted. Input features may include multi-channel complex sub-band features from the output of the AEC module 204 (e.g., per microphone and 8 ms audio frame). The output SSL labels may be divided into 36 classes (e.g., bins) with angular azimuthal resolution of 10 degrees and an audio frame size of 160 ms, at a sampling rate of 16 kHz. In some embodiments, there may be no overlap between the successive audio frames.

The training data 902 may include a mix of simulated data, real room impulse responses (RIRs), and real data collected from various devices such the device 110 used to train and evaluate the DNN. In some embodiments, during testing (e.g., by the testing module 910), only real data collected from the devices (e.g., the device 110) under diverse noise conditions (e.g., diverse device location, room types, etc.) may be used. The training data 902 may be labeled with both SSL labels and VAD labels per 160 ms audio frame. Once the training data 902 is prepared (e.g., with simulated and/or real data), it may be sent to feature extraction module 904 (e.g., a feature extraction pipeline), which may extract the multi-channel complex sub-band features for efficient serialization, with the SSL labels and VAD labels. The features may be raw and may be decoded for training and input to a model training module 906 (e.g., a model training pipeline). After several epochs and once loss convergence is observed, the DNN model may be quantized. The model training module 906 may be based in part on the DNN model/architecture, which may serve as a specification for model training.

In some embodiments, to reduce model size, 8-bit quantization of weights and activations may be performed (e.g., by the quantization module 908) before deployment of the DNN model (e.g., to the device 110 and/or the system 120). As discussed above, the probabilistic framework component 218 may inform the DNN/SSL module 216 output (e.g., the values $X_0$-$X_{35}$ which may be SSL predictions) with the time-related information from the wake word detector 1020 and/or the audio classifier 1022, computer vision data, mapping data, etc. The quantized DNN model may be used for testing the model.

In some embodiments, results from training/testing the DNN model and the probabilistic framework may be analyzed by an analysis module 912. The analysis module 912 may compare the results from testing the DNN model to the original input (e.g., ground truth data). The analysis module 912 may provide feedback data that may be used to inform and/or update the training data 902, the model training module 906, and/or the DNN/SSL module 206. For example, if performance of the DNN/SSL model was poor the training may be improved based on the feedback data from the analysis module 912.

Figure 10:
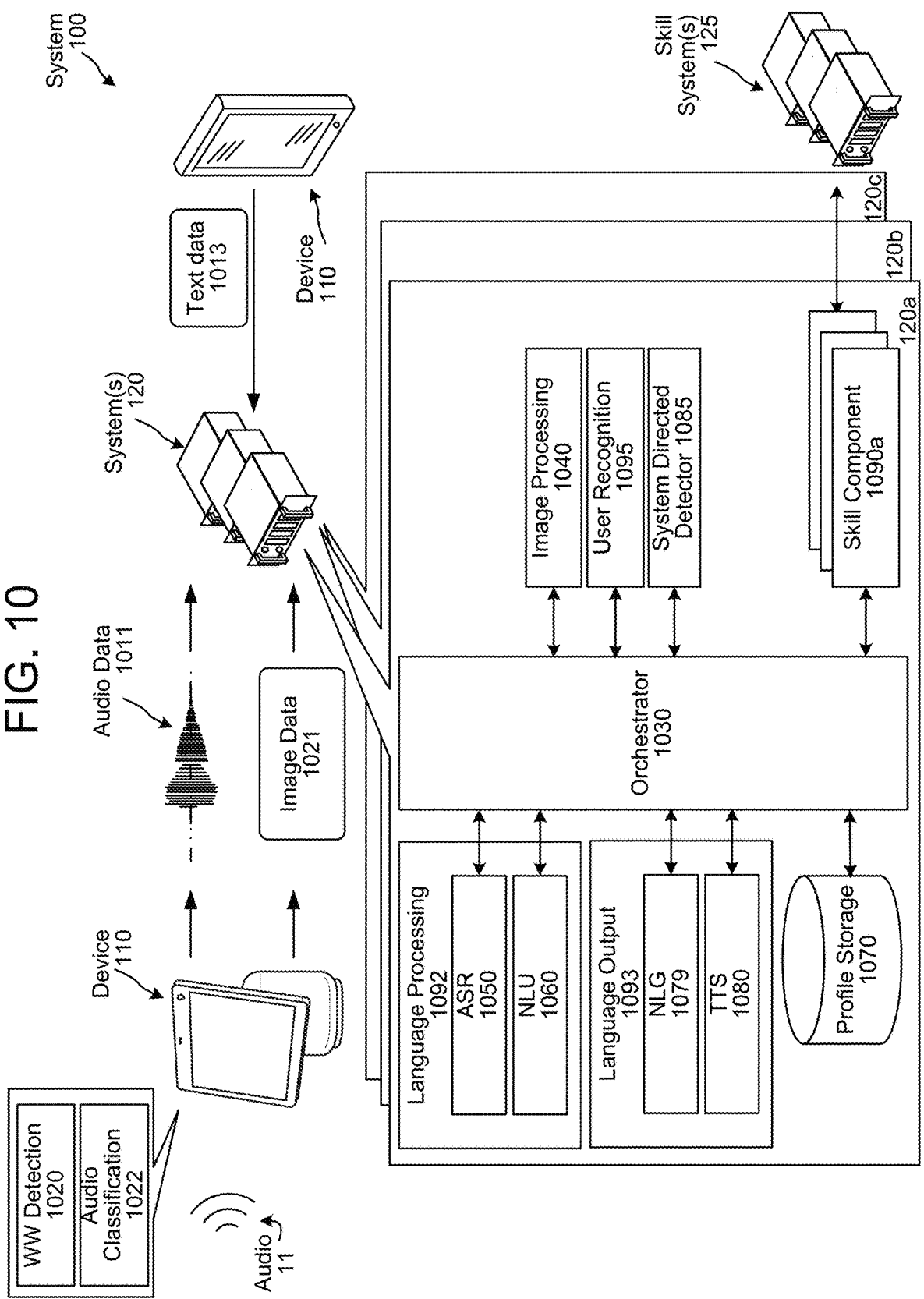
FIG. 10 is a conceptual diagram of components of the system, according to embodiments of the present disclosure.

The system 100 may operate using various components as described in FIG. 10. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of device 110. Other input forms may include indication that the user has pressed a physical or virtual button on device 110, the user has made a gesture, etc. The device 110 may also capture images using camera(s) 1518 of the device 110 and may send image data 1021 representing those image(s) to the system 120. The image data 1021 may include raw image data or image data processed by the device 110 before sending to the system 120. The image data 1021 may be used in various manners by different components of the system to perform operations such as determining whether a user is directing an utterance to the system, interpreting a user command, responding to a user command, etc.

The wakeword detector 1020 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, or other audio produced such as background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1020 and/or input is detected by an input detector, the device 110 may "wake" and begin transmitting audio data 1011, representing the audio 11, to the system(s) 120. The audio data 1011 may include data corresponding to the wakeword; in other embodiments, the portion of the audio corresponding to the wakeword is removed by the device 110 prior to sending the audio data 1011 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 1020 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 1090 of one or more systems 120.

The device 110 may also include a system directed input detector 1185. (The system 120 may also include a system directed input detector 1085 which may operate in a manner similar to system directed input detector 1185.) The system directed input detector 1185 may be configured to determine whether an input to the system (for example speech, a gesture, etc.) is directed to the system or not directed to the system (for example directed to another user, etc.). The system directed input detector 1185 may work in conjunction with the wakeword detector 1020. If the system directed input detector 1185 determines an input is directed to the system, the device 110 may "wake" and begin sending captured data for further processing (for example, processing audio data using the language processing 1092/1192, processing captured image data using image processing component 1040/1140 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1185 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1185 is determining whether an input is potentially device directed. For example, the system may output an orange indicator while considering an input, and may output a green indicator if a system directed input is detected. Other such configurations are possible. Further details regarding the system directed input detector 1185 are included below with regard to FIG. 12.

Upon receipt by the system(s) 120, the audio data 1011 may be sent to an orchestrator component 1030. The orchestrator component 1030 may include memory and logic that enables the orchestrator component 1030 to transmit various pieces and forms of data to various components of the system, as well as perform other operations as described herein.

The orchestrator component 1030 may send the audio data 1011 to a language processing component 1092. The language processing component 1092 (sometimes also referred to as a spoken language understanding (SLU) component) includes an automatic speech recognition (ASR) component 1050 and a natural language understanding (NLU) component 1060. The ASR component 1050 may transcribe the audio data 1011 into text data. The text data output by the ASR component 1050 represents one or more than one (e.g., in the form of an N-best list) ASR hypotheses representing speech represented in the audio data 1011. The ASR component 1050 interprets the speech in the audio data 1011 based on a similarity between the audio data 1011 and pre-established language models. For example, the ASR component 1050 may compare the audio data 1011 with models for sounds (e.g., acoustic units such as phonemes, senons, phones, etc.) and sequences of sounds to identify words that match the sequence of sounds of the speech represented in the audio data 1011. The ASR component 1050 sends the text data generated thereby to an NLU component 1060, via, in some embodiments, the orchestrator component 1030. The text data sent from the ASR component 1050 to the NLU component 1060 may include a single top-scoring ASR hypothesis or may include an N-best list including multiple top-scoring ASR hypotheses. An N-best list may additionally include a respective score associated with each ASR hypothesis represented therein. The ASR component 1050 is described in greater detail below with regard to FIG. 5.

The speech processing system 1092 may further include a NLU component 1060. The NLU component 1060 may receive the text data from the ASR component. The NLU component 1060 may attempts to make a semantic interpretation of the phrase(s) or statement(s) represented in the text data input therein by determining one or more meanings associated with the phrase(s) or statement(s) represented in the text data. The NLU component 1060 may determine an intent representing an action that a user desires be performed and may determine information that allows a device (e.g., the device 110, the system(s) 120, a skill component 1090, a skill system(s) 125, etc.) to execute the intent. For example, if the text data corresponds to "play the 5$^{th}$ Symphony by Beethoven," the NLU component 1060 may determine an intent that the system output music and may identify "Beethoven" as an artist/composer and "5th Symphony" as the piece of music to be played. For further example, if the text data corresponds to "what is the weather," the NLU component 1060 may determine an intent that the system output weather information associated with a geographic location of the device 110. In another example, if the text data corresponds to "turn off the lights," the NLU component 1060 may determine an intent that the system turn off lights associated with the device 110 or the user 5. However, if the NLU component 1060 is unable to resolve the entity—for example, because the entity is referred to by anaphora such as "this song" or "my next appointment"—the speech processing system 1092 can send a decode request to another speech processing system 1092 for information regarding the entity mention and/or other context related to the utterance. The speech processing system 1092 may augment, correct, or base results data upon the audio data 1011 as well as any data received from the other speech processing system 1092.

The NLU component 1060 may return NLU results data (which may include tagged text data, indicators of intent, etc.) back to the orchestrator 1030. The orchestrator 1030 may forward the NLU results data to a skill component(s) 1090. If the NLU results data includes a single NLU hypothesis, the NLU component 1060 and the orchestrator component 1030 may direct the NLU results data to the skill component(s) 1090 associated with the NLU hypothesis. If the NLU results data includes an N-best list of NLU hypotheses, the NLU component 1060 and the orchestrator component 1030 may direct the top scoring NLU hypothesis to a skill component(s) 1090 associated with the top scoring NLU hypothesis.

A skill component may be software running on the system(s) 120 that is akin to a software application. That is, a skill component 1090 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 1090. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 1090 may operate in conjunction between the system(s) 120 and other devices, such as the device 110, in order to complete certain functions. Inputs to a skill component 1090 may come from speech processing interactions or through other interactions or input sources. A skill component 1090 may include hardware, software, firmware, or the like that may be dedicated to a particular skill component 1090 or shared among different skill components 1090.

A skill support system(s) 125 may communicate with a skill component(s) 1090 within the system(s) 120 and/or directly with the orchestrator component 1030 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 1090 dedicated to interacting with the skill support system(s) 125. Unless expressly stated otherwise, reference to a skill, skill device, or skill component may include a skill component 1090 operated by the system(s) 120 and/or skill operated by the skill support system(s) 125. Moreover, the functionality described herein as a skill or skill may be referred to using many different terms, such as an action, bot, app, or the like. The skill 1090 and or skill support system(s) 125 may return output data to the orchestrator 1030.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system 120 includes a language output component 1093. The language output component 1093 includes a natural language generation (NLG) component 1079 and a text-to-speech (TTS) component 1080. The NLG component 1079 can generate text for purposes of TTS output to a user. For example the NLG component 1079 may generate text corresponding to instructions corresponding to a particular action for the user to perform. The NLG component 1079 may generate appropriate text for various outputs as described herein. The NLG component 1079 may include one or more trained models configured to output text appropriate for a particular input. The text output by the NLG component 1079 may become input for the TTS component 1080. Alternatively or in addition, the TTS component 1080 may receive text data from a skill 1090 or other system component for output.

The NLG component 1079 may include a trained model. The NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1080.

The TTS component 1080 may generate audio data (e.g., synthesized speech) from text data using one or more different methods. Text data input to the TTS component 1080 may come from a skill component 1090, the orchestrator component 1030, or another component of the system. In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 1011 representing the commands to the system(s) 120 for processing, after which the system(s) 120 may return output data that can cause the device 110 to engage its camera.

Upon receipt by the system(s) 120, the image data 1021 may be sent to an orchestrator component 1030. The orchestrator component 1030 may send the image data 1021 to an image processing component 1040. The image processing component 1040 can perform computer vision functions such as object recognition, modeling, reconstruction, etc. For example, the image processing component 1040 may detect a person, face, etc. (which may then be identified using user recognition component 1095). The image processing component 1040 is described in greater detail below with regard to FIG. 13. The device may also include an image processing component 1140 which operates similarly to image processing component 1040.

In some implementations, the image processing component 1040 can detect the presence of text in an image. In such implementations, the image processing component 1040 can recognize the presence of text, convert the image data to text data, and send the resulting text data via the orchestrator component 1030 to the language processing component 1092 for processing by the NLU component 1060.

The system(s) 120 may include a user recognition component 1095 that recognizes one or more users using a variety of data, as described in greater detail below. However, the disclosure is not limited thereto, and the device 110 may include a user recognition component 1195 instead of and/or in addition to user recognition component 1095 of the system(s) 120 without departing from the disclosure. User recognition component 1195 operates similarly to user recognition component 1095.

The user-recognition component 1095 may take as input the audio data 1011 and/or text data output by the ASR component 1050. The user-recognition component 1095 may perform user recognition by comparing audio characteristics in the audio data 1011 to stored audio characteristics of users. The user-recognition component 1095 may also perform user recognition by comparing biometric data (e.g., fingerprint data, iris data, etc.), received by the system in correlation with the present user input, to stored biometric data of users assuming user permission and previous authorization. The user-recognition component 1095 may further perform user recognition by comparing image data (e.g., including a representation of at least a feature of a user), received by the system in correlation with the present user input, with stored image data including representations of features of different users. The user-recognition component 1095 may perform additional user recognition processes, including those known in the art.

The user-recognition component 1095 determines scores indicating whether user input originated from a particular user. For example, a first score may indicate a likelihood that the user input originated from a first user, a second score may indicate a likelihood that the user input originated from a second user, etc. The user-recognition component 1095 also determines an overall confidence regarding the accuracy of user recognition operations.

Output of the user-recognition component 1095 may include a single user identifier corresponding to the most likely user that originated the user input. Alternatively, output of the user-recognition component 1095 may include an N-best list of user identifiers with respective scores indicating likelihoods of respective users originating the user input. The output of the user-recognition component 1095 may be used to inform NLU processing as well as processing performed by other components of the system.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 11:
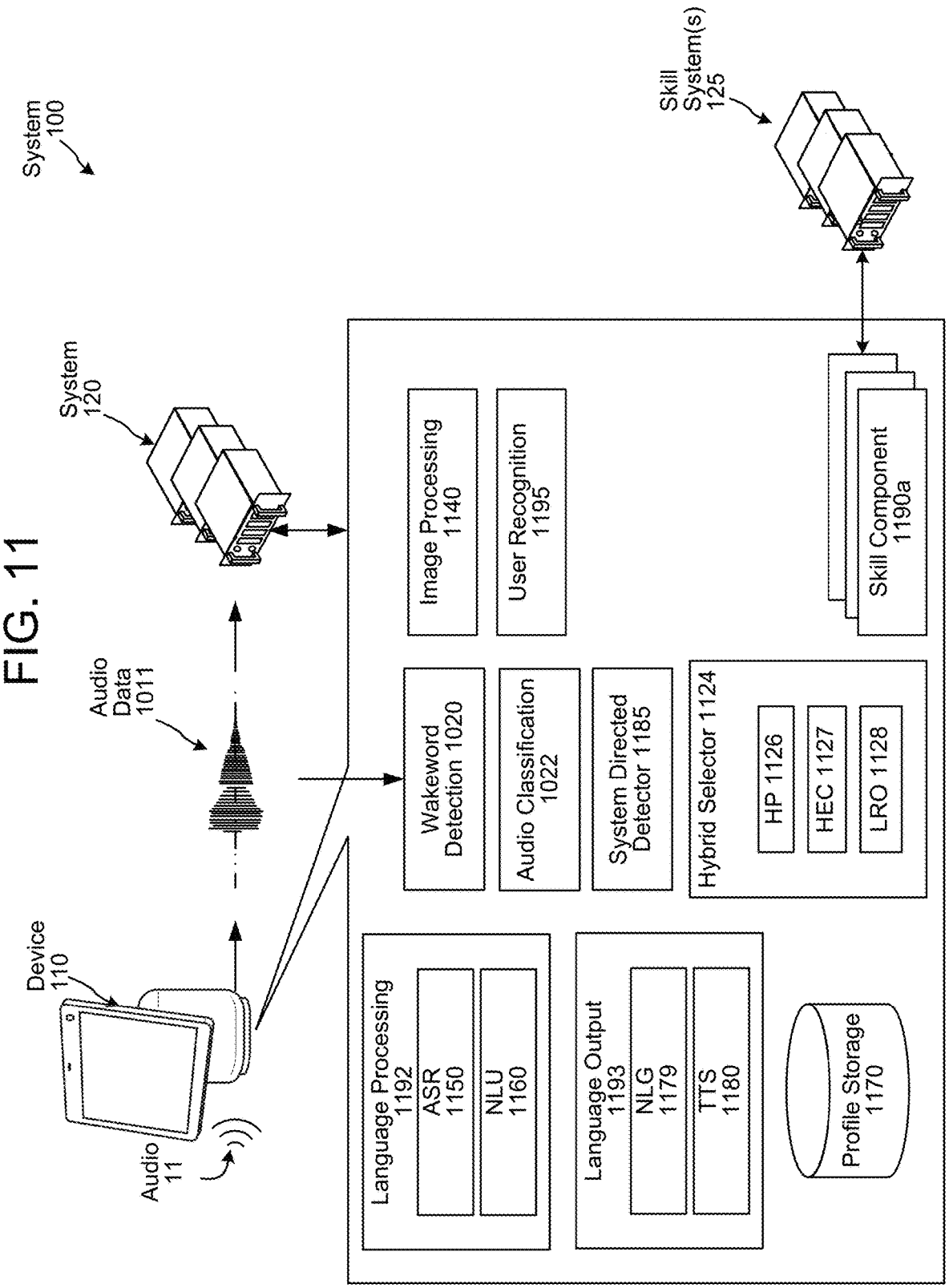
FIG. 11 is a conceptual diagram illustrating components that may be included in a device, according to embodiments of the present disclosure.

Although the components of FIG. 10 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 11 illustrates such a configured device 110.

In at least some embodiments, the system 120 may receive the audio data 1011 from the device 110, to recognize speech corresponding to a spoken input in the received audio data 1011, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 1180) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 10, the device 110 may include a wakeword detection component 1020 configured to compare the audio data 1011 to stored models used to detect a wakeword (e.g., "Alexa") that indicates to the device 110 that the audio data 1011 is to be processed for determining NLU output data (e.g., slot data that corresponds to a named entity, label data, and/or intent data, etc.). In at least some embodiments, a hybrid selector 1124, of the device 110, may send the audio data 1011 to the wakeword detection component 1020. If the wakeword detection component 1020 detects a wakeword in the audio data 1011, the wakeword detection component 1020 may send an indication of such detection to the hybrid selector 1124. In response to receiving the indication, the hybrid selector 1124 may send the audio data 1011 to the system 120 and/or the ASR component 1150. The wakeword detection component 1020 may also send an indication, to the hybrid selector 1124, representing a wakeword was not detected. In response to receiving such an indication, the hybrid selector 1124 may refrain from sending the audio data 1011 to the system 120, and may prevent the ASR component 1150 from further processing the audio data 1011. In this situation, the audio data 1011 can be discarded.

The device 110 may conduct its own speech processing using on-device language processing components, such as an SLU/language processing component 1192 (which may include an ASR component 1150 and an NLU 1160), similar to the manner discussed herein with respect to the SLU component 1092 (or ASR component 1050 and the NLU component 1060) of the system 120. Language processing component 1192 may operate similarly to language processing component 1092, ASR component 1150 may operate similarly to ASR component 1050 and NLU component 1160 may operate similarly to NLU component 1060. The device 110 may also internally include, or otherwise have access to, other components such as one or more skill components 1190 capable of executing commands based on NLU output data or other results determined by the device 110/system 120 (which may operate similarly to skill components 1090), a user recognition component 1195 (configured to process in a similar manner to that discussed herein with respect to the user recognition component 1095 of the system 120), profile storage 1170 (configured to store similar profile data to that discussed herein with respect to the profile storage 1070 of the system 120), or other components. In at least some embodiments, the profile storage 1170 may only store profile data for a user or group of users specifically associated with the device 110. Similar to as described above with respect to skill component 1090, a skill component 1190 may communicate with a skill system(s) 125. The device 110 may also have its own language output component 1193 which may include NLG component 1179 and TTS component 1180. Language output component 1193 may operate similarly to language processing component 1093, NLG component 1179 may operate similarly to NLG component 1079 and TTS component 1180 may operate similarly to TTS component 1080.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 1124, of the device 110, may include a hybrid proxy (HP) 1126 configured to proxy traffic to/from the system 120. For example, the HP 1126 may be configured to send messages to/from a hybrid execution controller (HEC) 1127 of the hybrid selector 1124. For example, command/directive data received from the system 120 can be sent to the HEC 1127 using the HP 1126. The HP 1126 may also be configured to allow the audio data 1011 to pass to the system 120 while also receiving (e.g., intercepting) this audio data 1011 and sending the audio data 1011 to the HEC 1127.

In at least some embodiments, the hybrid selector 1124 may further include a local request orchestrator (LRO) 1128 configured to notify the ASR component 1150 about the availability of new audio data 1011 that represents user speech, and to otherwise initiate the operations of local language processing when new audio data 1011 becomes available. In general, the hybrid selector 1124 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1011 is received, the HP 1126 may allow the audio data 1011 to pass through to the system 120 and the HP 1126 may also input the audio data 1011 to the on-device ASR component 1150 by routing the audio data 1011 through the HEC 1127 of the hybrid selector 1124, whereby the LRO 1128 notifies the ASR component 1150 of the audio data 1011. At this point, the hybrid selector 1124 may wait for response data from either or both of the system 120 or the local language processing components. However, the disclosure is not limited thereto, and in some examples the hybrid selector 1124 may send the audio data 1011 only to the local ASR component 1150 without departing from the disclosure. For example, the device 110 may process the audio data 1011 locally without sending the audio data 1011 to the system 120.

The local ASR component 1150 is configured to receive the audio data 1011 from the hybrid selector 1124, and to recognize speech in the audio data 1011, and the local NLU component 1160 is configured to determine a user intent from the recognized speech, and to determine how to act on the user intent by generating NLU output data which may include directive data (e.g., instructing a component to perform an action). Such NLU output data may take a form similar to that as determined by the NLU component 1060 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 1160) may be selected as usable to respond to a natural language user input, and local response data may be sent (e.g., local NLU output data, local knowledge base information, internet search results, and/or local directive data) to the hybrid selector 1124, such as a "ReadyToExecute" response. The hybrid selector 1124 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 1011 to the system 120, and the response data from the system 120 may include the unique identifier to identify which natural language user input the response data corresponds.

In at least some embodiments, the device 110 may include, or be configured to use, one or more skill components 1190 that may work similarly to the skill component(s) 1090 implemented by the system 120. The skill component(s) 1190 may correspond to one or more domains that are used in order to determine how to act on a spoken input in a particular way, such as by outputting a directive that corresponds to the determined intent, and which can be processed to implement the desired operation. The skill component(s) 1190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 1190, a skill system 125, or a combination of a skill component 1190 and a corresponding skill system 125.

Similar to the manner discussed with regard to FIG. 10, the local device 110 may be configured to recognize multiple different wakewords and/or perform different categories of tasks depending on the wakeword. Such different wakewords may invoke different processing components of local device 110 (not illustrated in FIG. 11). For example, detection of the wakeword "Alexa" by the wakeword detector 1020 may result in sending audio data to certain language processing components 1192/skills 1190 for processing while detection of the wakeword "Computer" by the wakeword detector may result in sending audio data different language processing components 1192/skills 1190 for processing.

Figure 12:
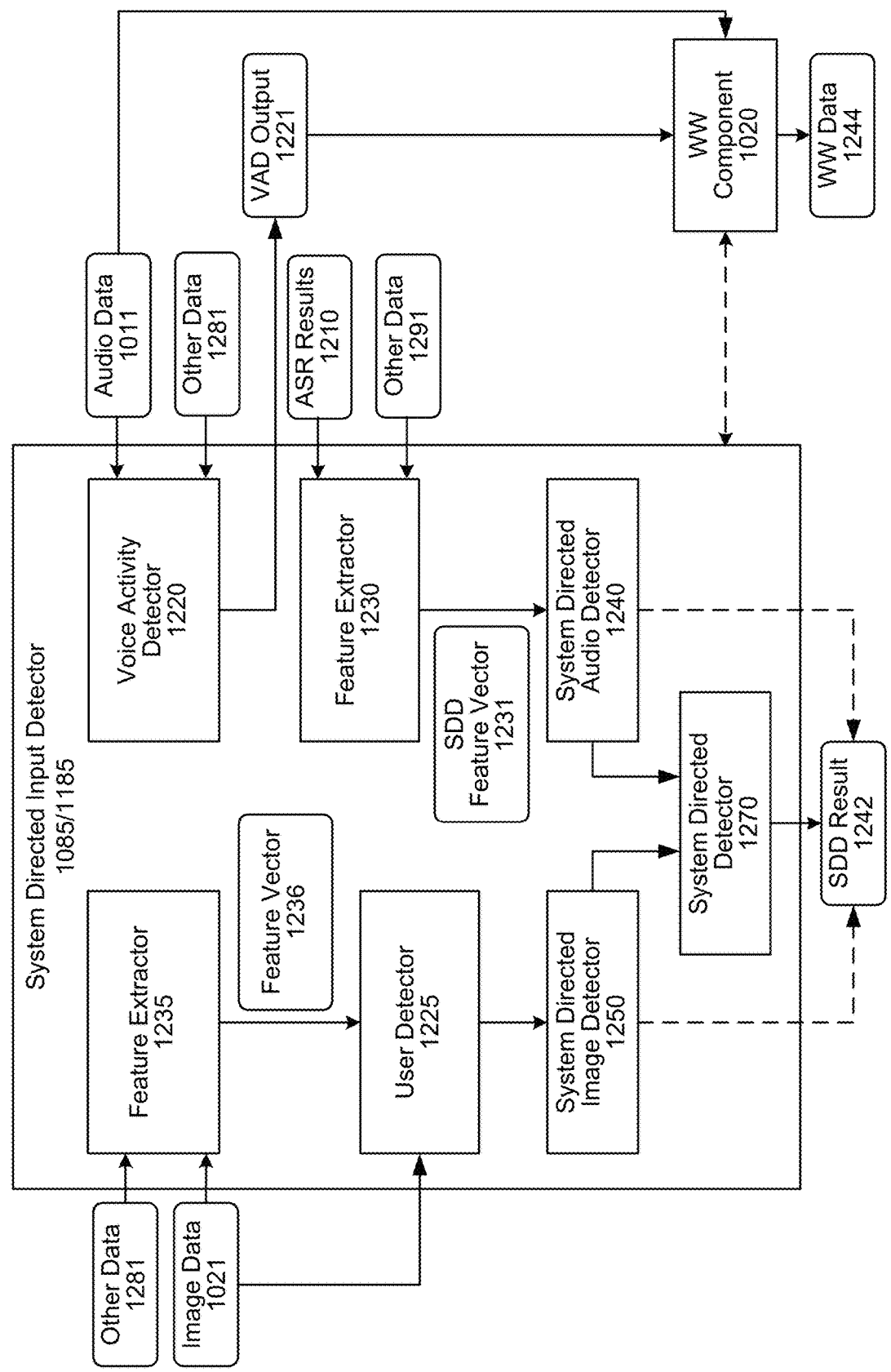
FIG. 12 is a conceptual diagram of components of a system to detect if raw input audio data includes system directed speech, according to embodiments of the present disclosure.

Configuration and operation of the system directed input detector 1185 is illustrated in FIG. 12. As shown in FIG. 12, the system directed input detector 1185 may include a number of different components. First, the system directed input detector 1185 may include a voice activity detector (VAD) 1220. The VAD 1220 may operate to detect whether the incoming audio data 1011 includes speech or not. The VAD output 1221 may be a binary indicator. Thus, if the incoming audio data 1011 includes speech, the VAD 1220 may output an indicator 1221 that the audio data 1011 does includes speech (e.g., a 1) and if the incoming audio data 1011 does not includes speech, the VAD 1220 may output an indicator 1221 that the audio data 1011 does not includes speech (e.g., a 0). The VAD output 1221 may also be a score (e.g., a number between 0 and 1) corresponding to a likelihood that the audio data 1011 includes speech. The VAD 1220 may also perform start-point detection as well as end-point detection where the VAD 1220 determines when speech starts in the audio data 1011 and when it ends in the audio data 1011. Thus the VAD output 1221 may also include indicators of a speech start point and/or a speech endpoint for use by other components of the system. (For example, the start-point and end-points may demarcate the audio data 1011 that is sent to the speech processing component 240.) The VAD output 1221 may be associated with a same unique ID as the audio data 1011 for purposes of tracking system processing across various components.

The VAD 1220 may operate using a variety of VAD techniques, including those described above with regard to VAD operations performed by device 110. The VAD may be configured to be robust to background noise so as to accurately detect when audio data actually includes speech or not. The VAD 1220 may operate on raw audio data 1011 such as that sent by device 110 or may operate on feature vectors or other data representing the audio data 1011. For example, the VAD 1220 may take the form of a deep neural network (DNN) and may operate on a single feature vector representing the entirety of audio data 1011 received from the device or may operate on multiple feature vectors, for example feature vectors representing frames of audio data where each frame covers a certain amount of time of audio data (e.g., 25 ms). The VAD 1220 may also operate on other data 1281 that may be useful in detecting voice activity in the audio data 1011. For example, the other data 1281 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 1011 to determine if that voice matches a voice in the reference section of speech. If the voices match, that may be an indicator to the VAD 1220 that speech was detected. If not, that may be an indicator to the VAD 1220 that speech was not detected. (For example, a representation may be taken of voice data in the first raw input audio data which may then be compared to the second raw input audio data to see if the voices match. If they do (or do not) that information may be considered by the VAD 1220.) The VAD 1220 may also consider other data when determining if speech was detected. The VAD 1220 may also consider speaker ID information (such as may be output by user recognition component 1095), directionality data that may indicate what direction (relative to the capture device 110) the incoming audio was received from. Such directionality data may be received from the device 110 and may have been determined by a beamformer or other component of device 110. The VAD 1220 may also consider data regarding a previous utterance which may indicate whether the further audio data received by the system is likely to include speech. Other VAD techniques may also be used.

If the VAD output 1221 indicates that no speech was detected the system (through orchestrator 1030 or some other component) may discontinue processing with regard to the audio data 1011, thus saving computing resources that might otherwise have been spent on other processes (e.g., ASR for the audio data 1011, etc.). If the VAD output 1221 indicates that speech was detected, the system may make a determination as to whether the speech was or was not directed to the speech-processing system. Such a determination may be made by the system directed audio detector 1240. The system directed audio detector 1240 may include a trained model, such as a DNN, that operates on a feature vector which represent certain data that may be useful in determining whether or not speech is directed to the system. To create the feature vector operable by the system directed audio detector 1240, a feature extractor 1230 may be used. The feature extractor 1230 may input ASR results 1210 which include results from the processing of the audio data 1011 by the speech recognition component 1150. For privacy protection purposes, in certain configurations the ASR results 1210 may be obtained from a language processing component 1192/ASR component 1150 located on device 110 or on a home remote component as opposed to a language processing component 1092/ASR component 1050 located on a cloud or other remote system 120 so that audio data 1011 is not sent remote from the user's home unless the system directed input detector component 1185 has determined that the input is system directed. Though this may be adjusted depending on user preferences/system configuration.

The ASR results 1210 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 1210 may include a trellis, which may include a raw search graph as scored during ASR decoding. The ASR results 1210 may also include a lattice, which may be a trellis as scored that has been pruned to remove certain hypotheses that do not exceed a score threshold or number of hypotheses threshold. The ASR results 1210 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 1210 may also include corresponding respective scores (such as for a trellis, lattice, confusion network, individual hypothesis, N-best list, etc.)

The ASR results 1210 (or other data 1291) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 1150 being less confident about its best hypothesis, which in turn may correlate to detected speech not being device directed. The entropy may be a feature included in other data 1291 to be considered by the system directed audio detector 1240.

The system may also determine and consider ASR decoding costs, which may include features from Viterbi decoding costs of the ASR. Such features may indicate how well the input acoustics and vocabulary match with the acoustic models 553 and language models 554. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 1150 is less confident about the top hypothesis, which may correlate to detected speech not being device directed. Other such features or data from the ASR results 1210 may also be used as other data 1291.

The ASR results 1210 may be represented in a system directed detector (SDD) feature vector 1231 that can be used to determine whether speech was system-directed. The feature vector 1231 may represent the ASR results 1210 but may also represent audio data 1011 (which may be input to feature extractor 1230) or other information. Such ASR results may be helpful in determining if speech was system-directed. For example, if ASR results include a high scoring single hypothesis, that may indicate that the speech represented in the audio data 1011 is directed at, and intended for, the device 110. If, however, ASR results do not include a single high scoring hypothesis, but rather many lower scoring hypotheses, that may indicate some confusion on the part of the speech recognition component 1150 and may also indicate that the speech represented in the audio data 1011 was not directed at, nor intended for, the device 110.

The ASR results 1210 may include complete ASR results, for example ASR results corresponding to all speech between a startpoint and endpoint (such as a complete lattice, etc.). In this configuration the system may wait until all ASR processing for a certain input audio has been completed before operating the feature extractor 1230 and system directed audio detector 1240. Thus the system directed audio detector 1240 may receive a feature vector 1231 that includes all the representations of the audio data 1011 created by the feature extractor 1230. The system directed audio detector 1240 may then operate a trained model (such as a DNN) on the feature vector 1231 to determine a score corresponding to a likelihood that the audio data 1011 includes a representation of system-directed speech. If the score is above a threshold, the system directed audio detector 1240 may determine that the audio data 1011 does include a representation of system-directed speech. The SDD result 1242 may include an indicator of whether the audio data includes system-directed speech, a score, and/or some other data.

The ASR results 1210 may also include incomplete ASR results, for example ASR results corresponding to only some speech between a between a startpoint and endpoint (such as an incomplete lattice, etc.). In this configuration the feature extractor 1230/system directed audio detector 1240 may be configured to operate on incomplete ASR results 1210 and thus the system directed audio detector 1240 may be configured to output an SSD result 1242 that provides an indication as to whether the portion of audio data processed (that corresponds to the incomplete ASR results) corresponds to system directed speech. The system may thus be configured to perform ASR at least partially in parallel with the system directed audio detector 1240 to process ASR result data as it is ready and thus continually update an SDD result 1242. Once the system directed input detector 1185 has processed enough ASR results and/or the SDD result 1242 exceeds a threshold, the system may determine that the audio data 1011 includes system-directed speech. Similarly, once the system directed input detector 1185 has processed enough ASR results and/or the SDD result 1242 drops below another threshold, the system may determine that the audio data 1011 does not include system-directed speech.

The SDD result 1242 may be associated with a same unique ID as the audio data 1011 and VAD output 1221 for purposes of tracking system processing across various components.

The feature extractor 1230 may also incorporate in a feature vector 1231 representations of other data 1291. Other data 1291 may include, for example, word embeddings from words output by the speech recognition component 1150 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 1230 processing and representing a word embedding in a feature vector 1231 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 1291 may also include, for example, NLU output from the natural language 260 component may be considered. Thus, if the natural language output data indicates a high correlation between the audio data 1011 and an out-of-domain indication (e.g., no intent classifier scores from the ICs or overall domain scores from the recognizers reach a certain confidence threshold), this may indicate that the audio data 1011 does not include system-directed speech. Other data 1291 may also include, for example, an indicator of a user/speaker as output user recognition component 1095. Thus, for example, if the user recognition component 1095 does not indicate the presence of a known user, or indicates the presence of a user associated with audio data 1011 that was not associated with a previous utterance, this may indicate that the audio data 1011 does not include system-directed speech. The other data 1291 may also include an indication that a voice represented in audio data 1011 is the same (or different) as the voice detected in previous raw input audio data corresponding to a previous utterance. The other data 1291 may also include directionality data, for example using beamforming or other audio processing techniques to determine a direction/location of a source of detected speech and whether that source direction/location matches a speaking user. The other data 1291 may also include data indicating that a direction of a user's speech is toward a device 110 or away from a device 110, which may indicate whether the speech was system directed or not.

Other data 1291 may also include image data 1021. For example, if image data is detected from one or more devices that are nearby to the device 110 (which may include the device 110 itself) that captured the audio data being processed using the system directed input detector (1185), the image data may be processed to determine whether a user is facing an audio capture device for purposes of determining whether speech is system-directed as further explained below.

Other data 1291 may also dialog history data. For example, the other data 1291 may include information about whether a speaker has changed from a previous utterance to the current audio data 1011, whether a topic of conversation has changed from a previous utterance to the current audio data, how NLU results from a previous utterance compare to NLU results obtained using the current audio data 1011, other system context information. The other data 1291 may also include an indicator as to whether the audio data 1011 was received as a result of a wake command or whether the audio data 1011 was sent without the device 110 detecting a wake command (e.g., the device 110 being instructed by remote system 120 and/or determining to send the audio data without first detecting a wake command).

Other data 1291 may also include information from the user profile 1070.

Other data 1291 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 1291 may also include acoustic feature data such as pitch, prosody, intonation, volume, or other data descriptive of the speech in the audio data 1011. As a user may use a different vocal tone to speak with a machine than with another human, acoustic feature information may be useful in determining if speech is device-directed.

Other data 1291 may also include an indicator that indicates whether the audio data 1011 includes a wakeword. For example, if a device 110 detects a wakeword prior to sending the audio data 1011 to the remote system 120, the device 110 may send along an indicator that the device 110 detected a wakeword in the audio data 1011. In another example, the remote system 120 may include another component that processes incoming audio data 1011 to determine if it includes a wakeword. If it does, the component may create an indicator indicating that the audio data 1011 includes a wakeword. The indicator may then be included in other data 1291 to be incorporated in the feature vector 1231 and/or otherwise considered by the system directed audio detector 1240.

Other data 1291 may also include device history data such as information about previous operations related to the device 110 that sent the audio data 1011. For example, the other data 1291 may include information about a previous utterance that was just executed, where the utterance originated with the same device 110 as a current utterance and the previous utterance was within a certain time window of the current utterance. Device history data may be stored in a manner associated with the device identifier (which may also be included in other data 1291), which may also be used to track other information about the device, such as device hardware, capability, location, etc.

The other data 1281 used by the VAD 1220 may include similar data and/or different data from the other data 1291 used by the feature extractor 1230. The other data 1281/1291 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 1240 and/or the VAD 1220) may be based on the data from the previous utterance. For example, a score threshold (for the system directed audio detector 1240 and/or the VAD 1220) may be based on acoustic data from a previous utterance.

The feature extractor 1230 may output a single feature vector 1231 for one utterance/instance of raw input audio data 1211. The feature vector 1231 may consistently be a fixed length, or may be a variable length vector depending on the relevant data available for particular audio data 1011. Thus, the system directed audio detector 1240 may output a single SDD result 1242 per utterance/instance of raw input audio data 1211. The SDD result 1242 may be a binary indicator. Thus, if the incoming audio data 1011 includes system-directed speech, the system directed audio detector 1240 may output an indicator 1242 that the audio data 1011 does includes system-directed speech (e.g., a 1) and if the incoming audio data 1011 does not includes system-directed speech, the system directed audio detector 1240 may output an indicator 1242 that the audio data 1011 does not system-directed includes speech (e.g., a 0). The SDD result 1242 may also be a score (e.g., a number between 0 and 1) corresponding to a likelihood that the audio data 1011 includes system-directed speech. Although not illustrated in FIG. 12, the flow of data to and from the system directed input detector 1185 may be managed by the orchestrator 1030 or by one or more other components.

The trained model(s) of the system directed audio detector 1240 may be trained on many different examples of SDD feature vectors that include both positive and negative training samples (e.g., samples that both represent system-directed speech and non-system directed speech) so that the DNN and/or other trained model of the system directed audio detector 1240 may be capable of robustly detecting when speech is system-directed versus when speech is not system-directed.

A further input to the system directed input detector 1185 may include output data from TTS component 1080 to avoid synthesized speech output by the system being confused as system-directed speech spoken by a user. The output from the TTS component 1080 may allow the system to ignore synthesized speech in its considerations of whether speech was system directed. The output from the TTS component 1080 may also allow the system to determine whether a user captured utterance is responsive to the TTS output, thus improving system operation.

The system directed input detector 1185 may also use echo return loss enhancement (ERLE) and/or acoustic echo cancellation (AEC) data to avoid processing of audio data generated by the system.

As shown in FIG. 12, the system directed input detector 1185 may simply user audio data to determine whether an input is system directed (for example, system directed audio detector 1240 may output an SDD result 1242). This may be true particularly when no image data is available (for example for a device without a camera). If image data 1021 is available, however, the system may also be configured to use image data 1021 to determine if an input is system directed. The image data 1021 may include image data captured by device 110 and/or image data captured by other device(s) in the environment of device 110. The audio data 1011, image data 1021 and other data 1281 may be time-stamped or otherwise correlated so that the system directed input detector 1185 may determine that the data being analyzed all relates to a same time window so as to ensure alignment of data considered with regard to whether a particular input is system directed. For example, the system directed input detector 1185 may determine system direct- edness scores for every frame of audio data/every image of a video stream and may align and/or window them to determine a single overall score for a particular input that corresponds to a group of audio frames/images.

Image data 1021 along with other data 1281 may be received by feature extractor 1235. The feature extractor may create one or more feature vectors 1236 which may represent the image data 1021/other data 1281. In certain examples, other data 1281 may include data from image processing component 1140 which may include information about faces, gesture, etc. detected in the image data 1021. For privacy protection purposes, in certain configurations any image processing/results thereof may be obtained from an image processing component 1140 located on device 110 or on a home remote component as opposed to a image processing component 1040 located on a cloud or other remote system 120 so that image data 1021 is not sent remote from the user's home unless the system directed input detector component 1185 has determined that the input is system directed. Though this may be adjusted depending on user preferences/system configuration.

The feature vector 1236 may be passed to the user detector 1225. The user detector 1225 (which may use various components/operations of image processing component 1140, user recognition component 1095, etc.) may be configured to process image data 1021 and/or feature vector 1236 to determine information about the user's behavior which in turn may be used to determine if an input is system directed. For example, the user detector 1225 may be configured to determine the user's position/behavior with respect to device 110/system 100. The user detector 1225 may also be configured to determine whether a user's mouth is opening/closing in a manner that suggests the user is speaking. The user detector 1225 may also be configured to determine whether a user is nodding or shaking his/her head. The user detector 1225 may also be configured to determine whether a user's gaze is directed to the device 110, to another user, or to another object. For example, the use detector 1225 may include, or be configured to use data from, a gaze detector. The user detector 1225 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 1225 may also be configured to determine a user's position/orientation such as facing another user, facing the device 110, whether their back is turned, etc. The user detector 1225 may also be configured to determine relative positions of multiple users that appear in image data (and/or are speaking in audio data 1011 which may also be considered by the user detector 1225 along with feature vector 1231), for example which users are closer to a device 110 and which are farther away. The user detector 1225 (and/or other component) may also be configured to identify other objects represented in image data and determine whether objects are relevant to a dialog or system interaction (for example determining if a user is referring to an object through a movement or speech).

The user detector 1225 may operate one or more models (e.g., one or more classifiers) to determine if certain situations are represented in the image data 1021. For example the user detector 1225 may employ a visual directedness classifier that may determine, for each face detected in the image data 1021 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 1225 (or other component(s) such as those in image processing 1140) may be configured to track a face in image data to determine which faces represented may belong to a same person. The system may user IOU based tracker, a mean-shift based tracker, a particle filter based tracker or other technique.

The user detector 1225 (or other component(s) such as those in user recognition component 1095) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 1250 may then determine, based on information from the user detector 1225 as based on the image data whether an input relating to the image data is system directed. The system directed image detector 1250 may also operate on other input data, for example image data including raw image data 1021, image data including feature data 1236 based on raw image data, other data 1281, or other data. The determination by the system directed image detector 1250 may result in a score indicating whether the input is system directed based on the image data. If no audio data is available, the indication may be output as SDD result 1242. If audio data is available, the indication may be sent to system directed detector 1270 which may consider information from both system directed audio detector 1240 and system directed image detector 1250. The system directed detector 1270 may then process the data from both system directed audio detector 1240 and system directed image detector 1250 to come up with an overall determination as to whether an input was system directed, which may be output as SDD result 1242. The system directed detector 1270 may consider not only data output from system directed audio detector 1240 and system directed image detector 1250 but also other data/metadata corresponding to the input (for example, image data/feature data 1236, audio data/feature data 1231, image data 1021, audio data 1011, or the like discussed with regard to FIG. 12. The system directed detector 1270 may include one or more models which may analyze the various input data to make a determination regarding SDD result 1242.

In one example the determination of the system directed detector 1270 may be based on "AND" logic, for example determining an input is system directed only if affirmative data is received from both system directed audio detector 1240 and system directed image detector 1250. In another example the determination of the system directed detector 1270 may be based on "OR" logic, for example determining an input is system directed if affirmative data is received from either system directed audio detector 1240 or system directed image detector 1250. In another example the data received from system directed audio detector 1240 and system directed image detector 1250 are weighted individually based on other information available to system directed detector 1270 to determine to what extend audio and/or image data should impact the decision of whether an input is system directed.

The system directed input detector 1185 may also receive information from a wakeword component 1020. For example, an indication that a wakeword was detected (e.g., WW data 1244) may be considered by the system directed input detector 1185 (e.g., by system directed audio detector 1240, system directed detector 1270, etc.) as part of the overall consideration of whether a system input was device directed. Detection of a wakeword may be considered a strong signal that a particular input was device directed.

If an input is determined to be system directed, the data related to the input may be sent to downstream components for further processing (e.g., to language processing 1092). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 1011 or image data 1021) sent to a remote system 120 that is outside a user's home or other direct control.

The system(s) 120 may include image processing component 1040. The image processing component 1040 may located across different physical and/or virtual machines. The image processing component 1040 may receive and analyze image data (which may include single images or a plurality of images such as in a video feed). The image processing component 1040 may work with other components of the system 120 to perform various operations. For example the image processing component 1040 may work with user recognition component 1095 to assist with user recognition using image data. The image processing component 1040 may also include or otherwise be associated with image data storage 1370 which may store aspects of image data used by image processing component 1040. The image data may be of different formats such as JPEG, GIF, BMP, MPEG, video formats, and the like.

Image matching algorithms, such as those used by image processing component 1040, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image.

For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 1370, profile storage 1070, or other storage component.

Image selection component 1320 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 1040 may be configured to select or discard an image quickly so that the system can, in turn, quickly process the selected image and deliver results to a user. The image selection component 1320 may select an image for object recognition by computing a metric/feature for each frame in the video feed and selecting an image for processing if the metric exceeds a certain threshold. While FIG. 13 illustrates image selection component 1320 as part of system 120, it may also be located on device 110 so that the device may select only desired image(s) to send to system 120, thus avoiding sending too much image data to system 120 (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD(metric)/MEAN(metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 1320 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 1320 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness (4*π*candidate glyph area/(perimeter)), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness (4*π*(candidate glyph number of pixels)/(perimeter)), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 1320 for sending to another component (e.g., from device to system 120) and/or for further processing, such as text recognition, object detection/resolution, etc.

The feature data calculated by image selection component 1320 may be sent to other components such as text recognition component 1340, objection detection component 1330, object resolution component 1350, etc. so that those components may use the feature data in their operations. Other preprocessing operations such as masking, binarization, etc. may be performed on image data prior to recognition/resolution operations. Those preprocessing operations may be performed by the device prior to sending image data or by system 120.

Object detection component 1330 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 1330 may process at least a portion of the image data to determine feature data. The feature data is indicative of one or more features that are depicted in the image data. For example, the features may be face data, or other objects, for example as represented by stored data in profile storage 1070. Other examples of features may include shapes of body parts or other such features that identify the presence of a human. Other examples of features may include edges of doors, shadows on the wall, texture on the walls, portions of artwork in the environment, and so forth to identify a space. The object detection component 1330 may compare detected features to stored data (e.g., in profile storage 1070, image data 1370, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit. Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 1330 the system may determine which object is actually seen using object resolution component 1350. Thus one component, such as object detection component 1330, may detect if an object is represented in an image while another component, object resolution component 1350 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 1330 may determine that a type of object is represented in image data and object resolution component 1350 may then determine which specific object is represented. The object resolution component 1350 may also make available specific data about a recognized object to further components so that further operations may be performed with regard to the resolved object.

Object detection component 1330 may be configured to process image data to detect a representation of an approximately two-dimensional (2D) object (such as a piece of paper) or a three-dimensional (3D) object (such as a face). Such recognition may be based on available stored data (e.g., 1070, 1370, etc.) which in turn may have been provided through an image data ingestion process managed by image data ingestion component 1310. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Figure 14:
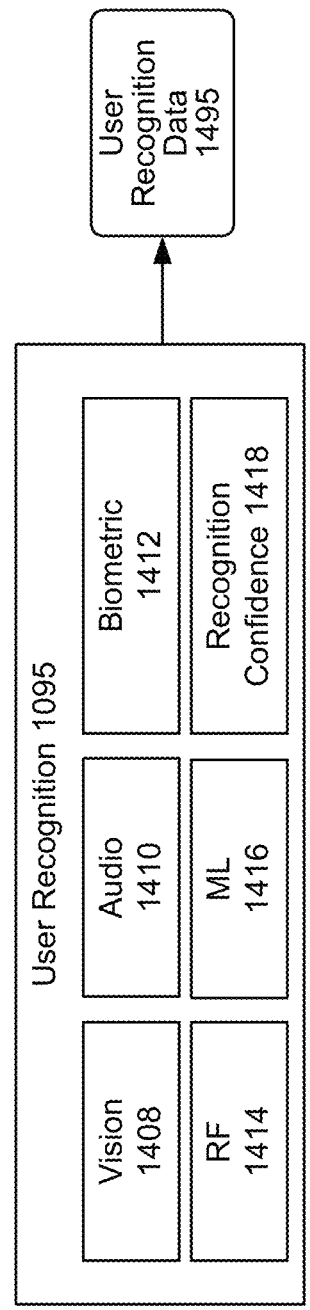
FIG. 14 is a schematic diagram of an illustrative architecture in which sensor data is combined to recognize one or more users according to embodiments of the present disclosure.

The device 110 and/or the system(s) 120 may include a user recognition component 1095 that recognizes one or more users using a variety of data. As illustrated in FIG. 14, the user recognition component 1095 may include one or more subcomponents including a vision component 1408, an audio component 1410, a biometric component 1412, a radio frequency (RF) component 1414, a machine learning (ML) component 1416, and a recognition confidence component 1418. In some instances, the user recognition component 1095 may monitor data and determinations from one or more subcomponents to determine an identity of one or more users associated with data input to the device 110 and/or the system(s) 120. The user recognition component 1095 may output user recognition data 1495, which may include a user identifier associated with a user the user recognition component 1095 determines originated data input to the device 110 and/or the system(s) 120. The user recognition data 1495 may be used to inform processes performed by various components of the device 110 and/or the system(s) 120.

The vision component 1408 may receive data from one or more sensors capable of providing images (e.g., cameras) or sensors indicating motion (e.g., motion sensors). The vision component 1408 can perform facial recognition or image analysis to determine an identity of a user and to associate that identity with a user profile associated with the user. In some instances, when a user is facing a camera, the vision component 1408 may perform facial recognition and identify the user with a high degree of confidence. In other instances, the vision component 1408 may have a low degree of confidence of an identity of a user, and the user recognition component 1095 may utilize determinations from additional components to determine an identity of a user. The vision component 1408 can be used in conjunction with other components to determine an identity of a user. For example, the user recognition component 1095 may use data from the vision component 1408 with data from the audio component 1410 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1412. For example, the biometric component 1412 may receive data corresponding to fingerprints, iris or retina scans, thermal scans, weights of users, a size of a user, pressure (e.g., within floor sensors), etc., and may determine a biometric profile corresponding to a user. The biometric component 1412 may distinguish between a user and sound from a television, for example. Thus, the biometric component 1412 may incorporate biometric information into a confidence level for determining an identity of a user. Biometric information output by the biometric component 1412 can be associated with specific user profile data such that the biometric information uniquely identifies a user profile of a user.

The radio frequency (RF) component 1414 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1414 the strength of the signal (e.g., as a received signal strength indication (RSSI)). The RF component 1414 may use the RSSI to determine an identity of a user (with an associated confidence level). In some instances, the RF component 1414 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 1416 may track the behavior of various users as a factor in determining a confidence level of the identity of the user. By way of example, a user may adhere to a regular schedule such that the user is at a first location during the day (e.g., at work or at school). In this example, the ML component 1416 would factor in past behavior and/or trends in determining the identity of the user that provided input to the device 110 and/or the system(s) 120. Thus, the ML component 1416 may use historical data and/or usage patterns over time to increase or decrease a confidence level of an identity of a user.

In at least some instances, the recognition confidence component 1418 receives determinations from the various components 1408, 1410, 1412, 1414, and 1416, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1495.

The audio component 1410 may receive data from one or more sensors capable of providing an audio signal (e.g., one or more microphones) to facilitate recognition of a user. The audio component 1410 may perform audio recognition on an audio signal to determine an identity of the user and associated user identifier. In some instances, aspects of device 110 and/or the system(s) 120 may be configured at a computing device (e.g., a local server). Thus, in some instances, the audio component 1410 operating on a computing device may analyze all sound to facilitate recognition of a user. In some instances, the audio component 1410 may perform voice recognition to determine an identity of a user.

The audio component 1410 may also perform user identification based on audio data 1011 input into the device 110 and/or the system(s) 120 for speech processing. The audio component 1410 may determine scores indicating whether speech in the audio data 1011 originated from particular users. For example, a first score may indicate a likelihood that speech in the audio data 1011 originated from a first user associated with a first user identifier, a second score may indicate a likelihood that speech in the audio data 1011 originated from a second user associated with a second user identifier, etc. The audio component 1410 may perform user recognition by comparing speech characteristics represented in the audio data 1011 to stored speech characteristics of users (e.g., stored voice profiles associated with the device 110 that captured the spoken user input).

Figure 15:
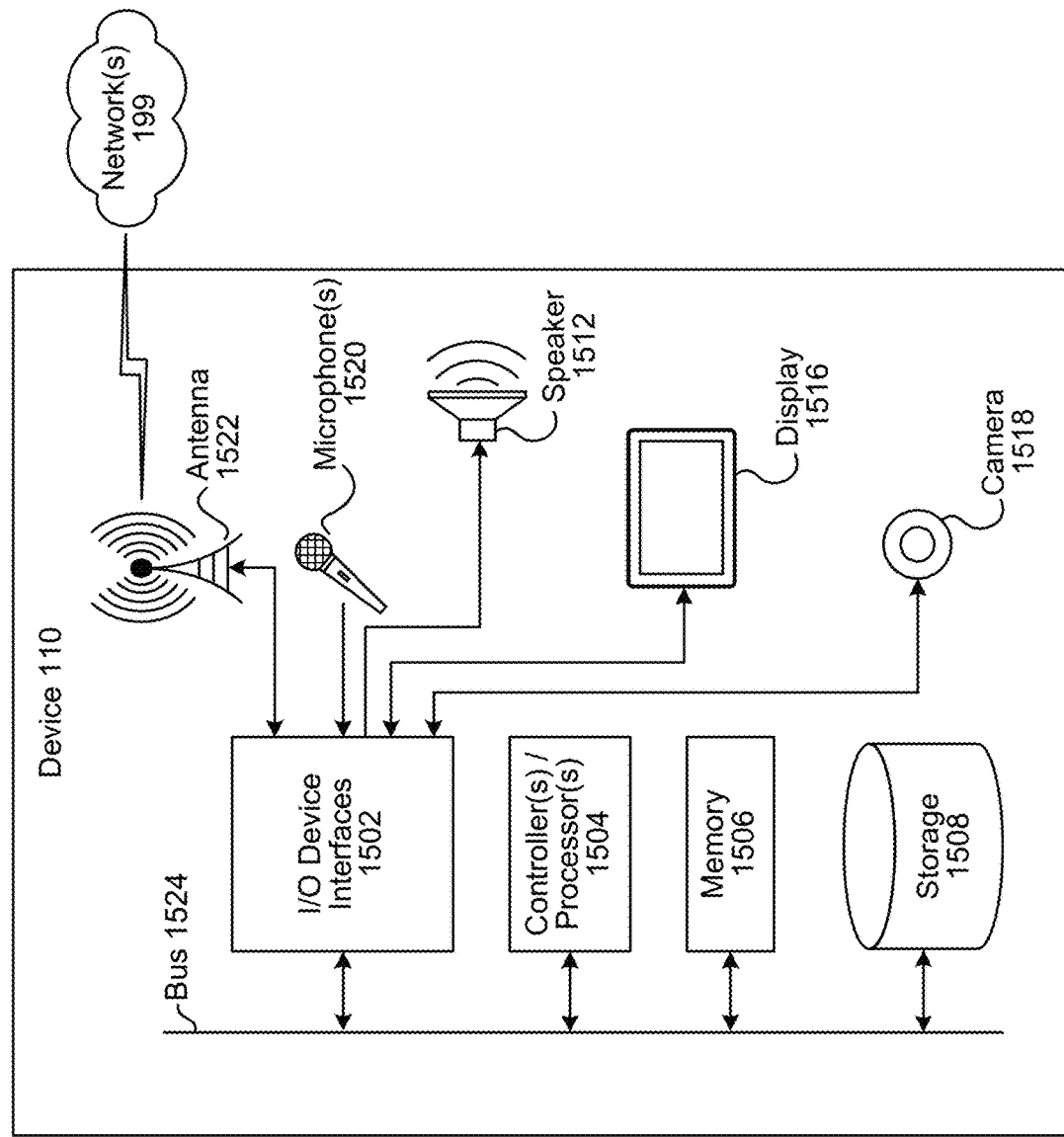
FIG. 15 is a block diagram conceptually illustrating example components of a device, according to embodiments of the present disclosure.
Figure 16:
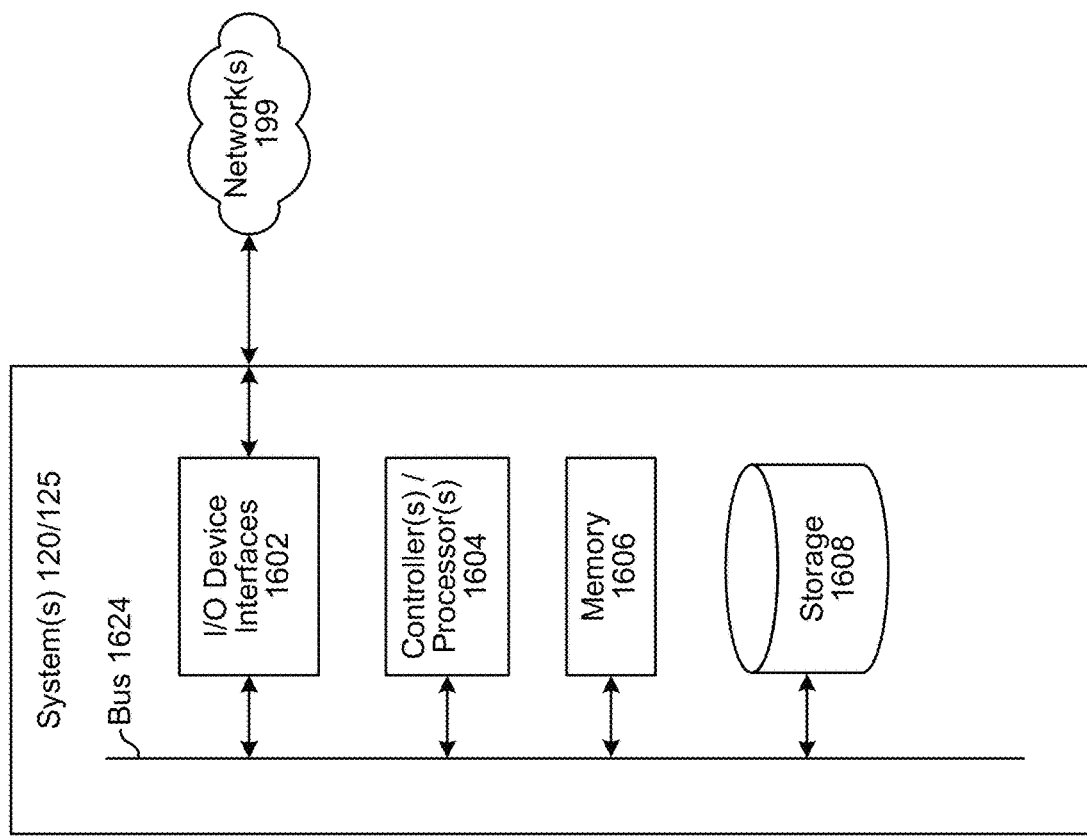
FIG. 16 is a block diagram conceptually illustrating example components of a system, according to embodiments of the present disclosure.

FIG. 15 is a block diagram conceptually illustrating a device 110 that may be used with the system. FIG. 16 is a block diagram conceptually illustrating example components of a remote device, such as the natural language command processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) he server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1522, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device(s) 110, the natural language command processing system 120, or a skill system 125 may include their own dedicated processors, memory, and/or storage. Alternatively, one or more of the components of the device(s) 110, the natural language command processing system 120, or a skill system 125 may utilize the I/O interfaces (1502/1602), processor(s) (1504/1604), memory (1506/1606), and/or storage (1508/1608) of the device(s) 110, natural language command processing system 120, or the skill system 125, respectively. Thus, the ASR component 1050 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 125, as described herein, are illustrative, and may be located as a stand-alone device or may be included, in whole or in part, as a component of a larger device or system. As can be appreciated, a number of components may exist either on a system 120 and/or on device 110. For example, language processing 1092/1192 (which may include ASR 1050/1150), language output 1093/1193 (which may include NLG 1079/1179 and TTS 1080/1180), etc., for example as illustrated in FIGS. 10 and 11. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 17, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1050, the NLU component 1060, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving first data corresponding to audio captured by a microphone array, the audio including an utterance of a wakeword;
   determining, using the first data, second data, the second data comprising a first value that corresponds to a first probability that the utterance originated from a first direction and a second value that corresponds to a second probability that the utterance originated from a second direction;
   determining third data by subtracting a third value from the first value to generate a fourth value and subtracting a fifth value from the second value to generate a sixth value, the third value and the fifth value corresponding to stationary noise of the audio, the third data comprising the fourth value and the sixth value, the fourth value corresponding to the first direction and the sixth value corresponding to the second direction;
   receiving fourth data corresponding to a start time and an end time associated with the utterance;
   receiving, from a sensor, fifth data, the fifth data indicating that it is likely that a first human is present in the first direction; and
   based at least in part on the third data, the fourth data, and the fifth data, determining that the utterance originated from the first direction.

2. The computer-implemented method of claim 1, further comprising:
   receiving sixth data prior to receiving the first data, the sixth data indicating that it is likely that a second human was present in the first direction; and
   receiving seventh data prior to receiving the first data, the seventh data indicating that it is unlikely that any human was present in the second direction,
   wherein determining that the utterance originated from the first direction is further based at least in part on the sixth data and the seventh data.

3. The computer-implemented method of claim 1, further comprising:
   determining sixth data indicating that it is likely that an obstacle is present in the second direction,
   wherein determining that the utterance originated from the first direction is further based at least in part on the sixth data.

4. The computer-implemented method of claim 1, further comprising:
   based at least in part on the third data, the fourth data, and the fifth data, determining a third probability that the utterance originated from the first direction,
   wherein determining that the utterance originated from the first direction is based at least in part on the third probability.

5. A computer-implemented method, comprising:
   receiving first data corresponding to audio captured by a microphone array;
   determining, using the first data, second data, the second data comprising a first value that corresponds to a first probability that the audio captured by the microphone array originated from a first direction and a second value that corresponds to a second probability that the audio originated from a second direction;
   receiving third data from a sensor;
   based at least in part on the second data and the third data, determining a third probability that the audio originated from the first direction and a fourth probability that the audio originated from the second direction; and
   based at least in part on the third probability being greater than the fourth probability, determining that the audio originated from the first direction.

6. The computer-implemented method of claim 5, further comprising:
   subtracting a third value from the first value to generate a fourth value corresponding to the first direction; and
   subtracting a fifth value from the second value to generate a sixth value corresponding to the second direction, the third value and the fifth value corresponding to stationary noise of the audio captured by the microphone array, the third data comprising the fourth value and the sixth value.

7. The computer-implemented method of claim 5, further comprising:
   receiving fourth data corresponding to at least one time associated with the audio,
   wherein determining the first probability is further based at least in part on the fourth data.

8. The computer-implemented method of claim 5, wherein the third data includes image data captured by the sensor, the image data indicating presence of a human in at least one of the first direction or the second direction.

9. The computer-implemented method of claim 5, further comprising:
   receiving fourth data corresponding to a position of a motor associated with the sensor,
   wherein determining that the audio originated from the first direction is further based at least in part on the fourth data.

10. The computer-implemented method of claim 5, further comprising:
    detecting, by the sensor, a human having a position corresponding to the first direction,
    wherein determining the first probability is based at least in part on detecting the position of the human.

11. The computer-implemented method of claim 5, further comprising:
    determining, based at least in part on the second data and the third data, that it is unlikely that any human is present in the first direction; and
    adjusting a position of the sensor based on determining that it is unlikely that any human is present in the first direction.

12. The computer-implemented method of claim 5, further comprising:
    receiving fourth data from a user indicating presence of an obstacle in the second direction,
    wherein determining the fourth probability that the audio originated from the second direction is further based at least in part on the fourth data.

13. A system comprising:
    at least one processor; and
    memory including instructions operable to be executed by the at least one processor to cause the system to:
    receive first data corresponding to audio captured by a microphone array;
    determining, using the first data, second data, the second data comprising a first value that corresponds to a first probability that the audio captured by the microphone array originated from a first direction and a second value that corresponds to a second probability that the audio originated from a second direction;
    receive third data from a sensor;
    based at least in part on the second data and the third data, determine a third probability that the audio originated from the first direction and a fourth probability that the audio originated from the second direction; and
    based at least in part on the third probability being greater than the fourth probability, determine that the audio originated from the first direction.

14. The system of claim 13, wherein the memory further comprises instructions that, when executed by the at least one processor, further cause the system to:
    subtract a third value from the first value to generate a fourth value corresponding to the first direction; and
    subtract a fifth value from the second value to generate a sixth value corresponding to the second direction, the third value and the fifth value corresponding to stationary noise of the audio captured by the microphone array, the third data comprising the fourth value and the sixth value.

15. The system of claim 13, wherein the memory further comprises instructions that, when executed by the at least one processor, further cause the system to:
    receive fourth data corresponding to at least one time associated with the audio,
    wherein determining the first probability is further based at least in part on the fourth data.

16. The system of claim 13, wherein the third data includes image data captured by the sensor, the image data indicating presence of a human in at least one of the first direction or the second direction.

17. The system of claim 13, wherein the memory further comprises instructions that, when executed by the at least one processor, further cause the system to:
    receive fourth data corresponding to a position of a motor associated with the sensor,
    wherein determining that the audio originated from the first direction is further based at least in part on the fourth data.

18. The system of claim 13, wherein the memory further comprises instructions that, when executed by the at least one processor, further cause the system to:
    detect, by the sensor, a human having a position corresponding to the first direction,
    wherein determining the first probability is based at least in part on detecting the position of the human.

19. The system of claim 13, wherein the memory further comprises instructions that, when executed by the at least one processor, further cause the system to:

determine, based at least in part on the second data and the third data, that it is unlikely that any human is present in the first direction; and adjust a position of the sensor based on determining that it is unlikely that any human is present in the first direction.

20. The system of claim 13, wherein the memory further comprises instructions that, when executed by the at least one processor, further cause the system to:

receive fourth data from a user indicating presence of an obstacle in the second direction, wherein determining the fourth probability that the audio originated from the second direction is further based at least in part on the fourth data.

* * * * *